(12) United States Patent
Nagafuchi et al.

(10) Patent No.: US 7,754,831 B2
(45) Date of Patent: Jul. 13, 2010

(54) VINYL POLYMER, PROCESS FOR PRODUCING VINYL POLYMER, THERMOSETTING COATING COMPOSITION, AND COATING MATERIAL

(75) Inventors: Yoshihide Nagafuchi, Otake (JP); Hirotoshi Mizota, Tokyo (JP); Yasuo Hiromoto, Yokohama (JP); Hisaaki Yoshimura, Otake (JP); Yoichi Nagai, Toyohashi (JP); Hiroyuki Kumaoka, Otake (JP); Takeshi Kato, Jakarta (ID); Tatsuki Yajima, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 826 days.

(21) Appl. No.: 10/540,265

(22) PCT Filed: Dec. 25, 2002

(86) PCT No.: PCT/JP02/13501
§ 371 (c)(1),
(2), (4) Date: Jun. 23, 2005

(87) PCT Pub. No.: WO2004/058826
PCT Pub. Date: Jul. 15, 2004

(65) Prior Publication Data
US 2006/0063897 A1    Mar. 23, 2006

(51) Int. Cl.
*C08F 2/04* (2006.01)
(52) U.S. Cl. .............................. 526/73; 526/78; 526/87
(58) Field of Classification Search .................... 526/73, 526/78, 87
See application file for complete search history.

(56) References Cited

U.S. PATENT DOCUMENTS

| | | | |
|---|---|---|---|
| 5,151,125 A | 9/1992 | Kuwajima et al. | |
| 5,183,504 A | 2/1993 | Kuwajima et al. | |
| 5,268,437 A | 12/1993 | Holy et al. | |
| 5,328,972 A | 7/1994 | Dada et al. | |
| 5,576,386 A | 11/1996 | Kempter et al. | |
| 6,045,870 A | 4/2000 | Noura et al. | |
| 6,388,026 B1 | 5/2002 | Campbell et al. | |
| 2002/0091270 A1 * | 7/2002 | Wu et al. | 548/243 |

FOREIGN PATENT DOCUMENTS

| | | | |
|---|---|---|---|
| EP | 0 552 876 | | 7/1993 |
| EP | 0 552 876 A1 * | | 7/1993 |
| JP | 59-6207 | | 1/1984 |
| JP | 1-172401 | | 7/1989 |
| JP | 2-45577 | | 2/1990 |
| JP | 2-286702 | | 11/1990 |
| JP | 3-287650 | | 12/1991 |
| JP | H05-171103 | | 7/1993 |
| JP | 5-271308 | | 10/1993 |
| JP | 5-331212 | | 12/1993 |
| JP | 6-184203 | | 7/1994 |
| JP | 7-228826 | | 8/1995 |
| JP | H11-080655 | | 3/1999 |
| JP | 2000-026506 | | 1/2000 |
| JP | 2001-131490 | | 5/2001 |
| JP | 2001-512753 | | 8/2001 |
| JP | 2002-37804 | | 2/2002 |
| JP | 2003-82004 | | 3/2003 |
| WO | WO 01/05841 A1 | | 1/2001 |
| WO | WO 01/05843 | | 1/2001 |

* cited by examiner

*Primary Examiner*—Robert D. Harlan
(74) *Attorney, Agent, or Firm*—Oblon, Spivak, McClelland, Maier & Neustadt, L.L.P.

(57) ABSTRACT

A vinyl-based polymer having a mass average molecular weight of 1500 to 10000, which is prepared by a first step of continuously feeding a material mixture containing a vinyl-based monomer to a continuous tank type first reactor, and polymerizing the vinyl-based monomer under the conditions of a polymerization temperature of 150° to 300° C. and a retention time of 1 to 60 minutes at a rate of polymerization of 50 to 99% to obtain a reaction intermediate mixture; and a second step of feeding a polymerization initiator in the amount of 0.01 to 5 parts by mass based on 100 parts by mass of the vinyl-based monomer and the reaction intermediate mixture to a second reactor, and further polymerizing the vinyl-based monomer under the conditions of a polymerization temperature of 100° to 200° C. and a retention time of 10 to 240 minutes at a rate of polymerization of 80% or more.

11 Claims, No Drawings

VINYL POLYMER, PROCESS FOR PRODUCING VINYL POLYMER, THERMOSETTING COATING COMPOSITION, AND COATING MATERIAL

TECHNICAL FIELD

The present invention relates to a low-molecular weight vinyl-based polymer and a method for producing the same, and, more particularly, to a thermosetting coating composition and a coating material comprising the composition which are suited for use as a coating material for top coating of automobiles and can meet the high solid-requirement.

BACKGROUND ART

It is required that a coating material for top coating of automobiles is excellent in curability at low temperature and storage stability and causes less surface bursting during the formation of a coating film, and is also capable of forming a coating film which is excellent in hardness, toughness, crosslinking density, acid resistance, thermal yellowing resistance, weatherability, water resistance, solvent resistance and scratch resistance. The term "surface bursting" means a phenomenon in which holes or depressions are formed due to the coating material repelled during the formation of a coating film.

As a main component of the coating material for top coating of automobiles, vinyl-based polymers have hitherto been used. Among these vinyl-based polymers, an acryl-melamine-based resin has widely been adopted because a coating film having excellent weatherability and decorative properties. However, a melamine resin contained as a curing agent in the acryl-melamine-based resin is insufficient in acid resistance. Therefore, when the resulting coating film is exposed to acid rain, the coating film is stained with rain and thus the appearance may become inferior. Therefore, various curing systems which utilize the crosslinking reaction of an acid group with an epoxy group have proposed as curing systems to be replaced by the melamine resin, for example, Japanese Unexamined Patent Application, First Publication No. Hei 2-45577 and Japanese Unexamined Patent Application, First Publication No. Hei 3-287650 propose the curing systems.

On the other hand, with the recent increase of an interest in an environmental problem, it has become important to decrease the amount of the solvent in the coating material, that is, to meet the "high solid-requirement". However, a high solid coating material may cause problems such as increase in solution viscosity and poor coating workability.

A method which meets the high solid-requirement and also improves the workability (i.e. decrease in viscosity) of the coating material includes, for example, a decrease in molecular weight of the vinyl-based polymer. However, when the amount of a polymerization initiator used in the preparation is increased so as to decrease the molecular weight of the vinyl-based polymer, properties of the coating film such as acid resistance, weatherability and scratch resistance may be lowered. On the other hand, a method for decreasing the molecular weight of the vinyl-based copolymer without increasing the amount of the polymerization initiator includes, for example, the use in combination with a chain transfer agent such as mercaptanes. However, the chain transfer agent may cause deterioration of weatherability of the coating film.

By the way, a large amount of the unreacted monomer may be remained in the low-molecular weight vinyl-based polymer. The small amount of the unreacted monomer is preferable because it may cause surface bursting and foaming on the surface of the coating film during the use of the vinyl-based polymer.

In Japanese Unexamined Patent Application, First Publication No. Sho 59-6207, a method of preparing a low-molecular weight vinyl-based polymer with less unreacted monomer content is disclosed. According to this method, the vinyl-based monomer is polymerized at high temperature using a continuous tank reactor and then the unreacted monomer is removed by volatilization.

However, the method described in Japanese Unexamined Patent Application, First Publication No. Sho 59-6207 has such a problem that a large quantity of heat is required so as to volatilize the unreacted monomer, thus resulting in high cost. Even if the unreacted monomer is removed by the other method, a removing apparatus is required in the removing step and also the removing time is required, thus resulting in low productivity. Therefore, it has been required to develop a process which does not require the step of removing the unreacted monomer.

To decrease the amount of the unreacted monomer, polymerization may be carried out until the unreacted monomer substantially disappears, that is, the rate of polymerization reaches about 100%. However, it was difficult to control the rate of polymerization to 100% using a continuous tank reactor.

To prepare a vinyl-based polymer which exhibits a high rate of polymerization and also has a low molecular weight, it may be effective to raise the polymerization temperature and increases the retention time. If the polymerization temperature is too high, it exceeds so-called ceiling temperature and the depolymerization reaction as a reverse reaction dominantly occurs, and thus high temperature exerts an adverse effect on high rate of polymerization and the amount of by-products may increase.

It has hitherto been difficult to efficiently prepare the vinyl-based polymer, which exhibits a high rate of polymerization and also has a low molecular weight, only by raising the reaction temperature and increasing the polymerization time.

DISCLOSURE OF THE INVENTION

Under these circumstances, the present invention has been made and an object thereof is to provide a low-molecular weight vinyl-based polymer with less unreacted monomer content, and further provides a thermosetting coating composition and a coating material comprising the composition which are excellent in curability at low temperature and storage stability and causes less surface bursting during the formation of a coating film and is also capable of forming a coating film which is excellent in hardness, toughness, crosslinking density, acid resistance, thermal yellowing resistance, weatherability, water resistance, solvent resistance and scratch resistance, and also which is suited for use as a coating material for top coating of automobiles and can meet the high solid-requirement.

The present inventors have found that a low-molecular weight vinyl-based polymer with less unreacted monomer content can be efficiently prepared by polymerizing a vinyl-based monomer under specific conditions and also found that a composition containing, as a main component, a specific vinyl-based polymer having a low molecular weight with less unreacted vinyl-based monomer content is suited for use as a thermosetting coating composition and solves the above problems. Thus, the present invention has been completed.

The present invention is directed to a vinyl-based polymer having a mass average molecular weight of 1500 to 10000, which is prepared by a first step of continuously feeding a material mixture containing a vinyl-based monomer to a continuous tank type first reactor, and polymerizing the vinyl-based monomer under conditions of a polymerization temperature of 150° to 300° C. and a retention time of 1 to 60 minutes at a rate of polymerization of 50 to 99% to obtain a reaction intermediate mixture; and a second step of feeding a polymerization initiator in an amount of 0.01 to 5 parts by mass based on 100 parts by mass of the vinyl-based monomer and the reaction intermediate mixture to a second reactor, and further polymerizing the vinyl-based monomer under conditions of a polymerization temperature of 100° to 200° C. and a retention time of 10 to 240 minutes at a rate of polymerization of 80% or more.

Also, the present invention is directed to a method for producing a vinyl-based polymer, comprising the steps of: a fit step of continuously feeding a material mixture containing a vinyl-based monomer to a continuous tank type first reactor and polymerizing the vinyl-based monomer under conditions of a polymerization temperature of 150° to 300° C. and a retention time of 1 to 60 minutes at a rate of polymerization of 50 to 99% to obtain a reaction intermediate mixture; and a second step of feeding a polymerization initiator in the amount of 0.01 to 5 parts by mass based on 100 parts by mass of the vinyl-based monomer and the reaction intermediate mixture to a second reactor, and further polymerizing the vinyl-based monomer under conditions of a polymerization temperature of 100° to 200° C. and a retention time of 10 to 240 minutes at a rate of polymerization of 80% or more.

Furthermore, the present invention is directed to a thermosetting coating composition comprising a polymer solution (A) comprising, as a main component, a vinyl-based polymer having a mass average molecular weight of 2000 to 7000 and containing epoxy groups, and the amount of a residual monomer containing vinyl groups of 1% by mass or less and a resin solid content of 50 to 90% by mass; and a polymer solution (B) comprising, as a main component, a vinyl-based polymer having a mass average molecular weight of 2000 to 7000 and containing carboxyl groups and/or acid anhydride groups, and the amount of a residual monomer containing vinyl groups of 1% by mass or less and a resin solid content being 50 to 90% by mass, and to a coating material containing the same.

BEST MODE FOR CARRYING OUT THE INVENTION

The present invention will now be described in detail.

The vinyl-based polymer of the present invention is obtained by conducting a first step of continuously polymerizing a vinyl-based monomer at a polymerization temperature of 150° to 300° C. and a retention time of 1 to 60 minutes, and then conducting a second step of polymerizing at a polymerization temperature of 100° to 200° C. and a retention time of 10 to 240 minutes.

First, in the first step, a reaction intermediate mixture is prepared by continuously feeding a material mixture containing the vinyl-based monomer to a continuous tank type first reactor (A) and polymerizing the vinyl-based monomer.

The reaction intermediate mixture contains a polymer obtained by polymerizing the vinyl-based monomer in the first step, and an unreacted vinyl-based monomer.

The vinyl-based monomer is selected according to applications of the vinyl-based polymer obtained finally. Examples thereof include monomers having an acid group, monomers having a hydroxyl group, (meth)acrylate esters having a hydrocarbon substituent, styrene-based monomers, ethylenically unsaturated nitrites, vinyl esters, epoxy group-containing vinyl monomers, ethylenically unsaturated basic vinyl monomers, and $\alpha,\beta$-unsaturated vinyl monomers having an N-alkoxyalkyl-substituted amide group. Among these monomers, a styrene-based monomer and/or an acryl-based monomer among the above-mentioned monomers are preferably used. Because a polymer obtained by polymerizing a styrene-based monomer and/or an acryl-based monomer is preferable as the vinyl-based polymer used in coating materials, adhesives, and coating agents.

Examples of the monomer having an acid group include monobasic acid or dibasic acid vinyl monomers such as methacrylic acid, acrylic acid, crotonic acid, vinylbenzoic acid, fumaric acid, itaconic acid, maleic acid, and citraconic acid; dibasic anhydride vinyl monomers such as maleic anhydride; $\beta$-carboxyethyl (meth)acrylate, $\beta$-carboxypropyl (meth)acrylate, $\beta$-(meth)acryloxyethylacid succinate, $\beta$-(meth)acryloxyethylacid maleate, $\beta$-(meth)acryloxyethylacid phthalate, $\beta$-(meth)acryloxyethylacid hexahydrophthalate, $\beta$-(meth)acryloxyethylacid methylhexahydrophthalate, or $\gamma$-(meth)acryloxypropylacid succinate; long-chain carboxyl group-containing vinyl monomers such as monoester reaction product of dibasic anhydride and caprolactone-modified hydroxyl group-containing (meth)acrylate ester (for example, succinic acid monoester, phthalic acid monoester, or anhydrous hexahydrophthalic acid monoester), in which a carboxyl group is introduced into terminals by esterifying a terminal hydroxyl group of a ring-opening adduct of $\epsilon$-caprolactone or $\gamma$-butyrolactone to 2-hydroxyethyl (meth)acrylate (for example, PLACCEL F monomer manufactured by Daicel Chemical Industries, Ltd., or TONE M monomer manufactured by UCC Co.) with succinic anhydride, phthalic anhydride or hexahydrophthalic anhydride; and monoesters of dibasic acid or dibasic anhydride vinyl monomer, such as monomethyl maleate, monoethyl maleate, monobutyl maleate, monooctyl maleate, monomethyl itaconate, monoethyl itaconate, monobutyl itaconate, monooctyl itaconate, mono 2-ethylhexyl itaconate, monomethyl fumarate, monoethyl fumarate, monobutyl fumarate, monooctyl fumarate, and monoethyl citraconate.

Examples of the monomer having a hydroxyl group include (meth)acrylate esters having a hydroxyalkyl group, such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, and 6-hydroxyhexyl (meth)acrylate; (meth)acrylate esters having a hydroxyl group at terminals, such as ring-opening adduct of $\beta$-butyrolactone to 2-hydroxyethyl (meth)acrylate, ring-opening adduct of $\epsilon$-caprolactone to 2-hydroxyethyl (meth)acrylate, ring-opening adduct of ethylene oxide to (meth)acrylic acid, and ring-opening adduct of propylene oxide to (meth)acrylic acid, and dimer or trimer of 2-hydroxyethyl (meth)acrylate or 2-hydroxypropyl (meth)acrylate; and other hydroxyl group-containing vinyl monomers such as 4-hydroxybutyl vinyl ether and p-hydroxystyrene.

Examples of the (meth)acrylate esters having a hydrocarbon substituent include methyl (meth)acrylate, ethyl (meth)acrylate, n-propyl (meth)acrylate, n-butyl (meth)acrylate, i-butyl (meth)acrylate, t-butyl (meth)acrylate, sec-butyl (meth)acrylate, n-pentyl (meth)acrylate, n-octyl (meth)acrylate, lauryl (meth)acrylate, stearyl (meth)acrylate, tridecyl (meth)acrylate, 2-ethylhexyl (meth)acrylate, cyclohexyl (meth)acrylate, phenyl (meth)acrylate, benzyl (methacrylate, and isoboronyl (meth)acrylate.

Examples of the styrene-based monomer include styrene derivatives such as styrene, o-methylstyrene, m-methylstyrene, p-methylstyrene, $\alpha$-methylstyrene, p-ethylstyrene, 2,4- dimethylstyrene, p-n-butylstyrene, p-tert-butylstyrene, p-n-hexylstyrene, p-n-octylstyrene, p-n-nonylstyrene, p-n-decylstyrene, p-n-dodecyltyrene, p-phenylstyrene, 3,4-dicrosylstyrene, and vinyl toluene.

Among these, styrene, o-methylstyrene, m-methylstyrene, p-methylstyrene, α-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecyltyrene, p-phenylstyrene, 3,4-dicrosylstyrene, and vinyl toluene are particularly preferable styrene-based monomers.

Examples of the ethylenically unsaturated nitriles include acrylonitrile and methacrylonitrile.

Examples of the vinyl esters include vinyl acetate.

Examples of the epoxy group-containing vinyl monomers include glycidyl (meth)acrylate, methyl glycidyl (meth)acrylate, and allyl glycidyl ether. Among these epoxy group-containing vinyl monomers, glycidyl (meth)acrylate and methyl glycidyl (meth)acrylate are particularly preferable.

Examples of the ethylenically unsaturated basic vinyl monomers include dimethylaminoethyl (meth)acrylate and diethylaminoethyl (meth)acrylate.

Examples of the α,β-unsaturated vinyl monomers having an N-alkoxyalkyl-substituted amide group include N-methoxymethylacrylamide, N-methoxymethylmethacrylamide, N-ethoxymethylacrylamide, N-propoxymethylacrylamide, and N-butoxymethylacrylamide. These monomers can be used alone or in combination, if necessary.

Among the above-mentioned vinyl-based monomers, particularly preferred acryl-based monomers are (meth)acrylate esters having a hydrocarbon substituent, such as methyl (meth)acrylate, ethyl (meth)acrylate, n-butyl (meth)acrylate, t-butyl (meth)acrylate, i-butyl (meth)acrylate, n-octyl (meth)acrylate, lauryl (meth)acrylate, stearyl (meth)acrylate, 2-ethylhexyl (meth)acrylate, and isobornyl (meth)acrylate; and (meth)acrylate esters having a hydroxyalkyl group, such as 2-hydroxyethyl (meth)acrylate, 2-hydroxypropyl (meth)acrylate, and 4-hydroxybutyl (meth)acrylate.

In the first step, a material mixture is preferably fed to a first reactor after mixing with a polymerization initiator. When the material mixture is polymerized after mixing with the polymerization initiator, the molecular weight of the vinyl-based polymer can be easily lowered and also the rate of polymerization can be increased.

The polymerization initiator is not specifically limited as long as a radical can be generated by decomposing at a polymerization temperature and examples thereof include organic peroxides such as 2,2-bis(4,4-di-t-butylperoxycyclohexyl)propane, t-butylperoxy 2-ethylhexanoate, t-butyl peroxylaurate, t-butylperoxy 3,5,5-trimethylhexanoate, cyclohexanoneperoxide, t-butylperoxy isopropylcarbonate, t-butylperoxyacetate, t-butylperoxybienzoate, butylperoxybienzoate, t-hexylperoxy 2-ethylhexanoate, dicumyl peroxide, t-butylcumyl peroxide, diisopropylbenzenehydroperoxide, di-t-butyl peroxide, di-t-amylperoxide, di-t-hexylperoxide, p-methanehydroperoxide, cumenhydroperoxide, and t-butylhydroperoxide; azo compounds such as azobisisobutylnitrile, azobisvaleronitrile, 2-(carbamoylazo)isobutyronitrile, 2,2-azobis(2,4,4-trimethylpentane), and 2-phenylazo-2,4-dimethyl-4-methoxyvaleronitrile; persulfates such as potassium persulfate; and redox-based polymerization initiators.

The material mixture preferably contains the polymerization initiator in the amount of 0.01 to 12 parts by mass based on 100 parts by mass of the vinyl-based monomer. The material mixture more preferably contains the polymerization initiator in the amount of 0.1 to 10 parts by mass based on 100 parts by mass of the vinyl-based monomer. When the amount of the polymerization initiator is 0.01 part by mass or more, the effect of the use of the polymerization initiator is exerted, and then the molecular weight of the vinyl-based polymer can be further lowered and the rate of polymerization can be further increased. When the amount of the polymerization initiator is 0.1 parts by mass or more, the effect is more remarkably exerted.

When the amount of the polymerization initiator exceeds 12 parts by mass, further decrease in molecular weight and increase in rate of polymerization can be expected. However, the cost increases and it is not preferred from an industrial point of view. On the other hand, when the amount of the polymerization initiator is 10 parts by mass or less, the effect of lowering the molecular weight of the vinyl-based polymer to enhance the rate of polymerization is sufficiently exerted and the cost of the polymerization initiator can be reduced.

The material mixture preferably contains a solvent. When the material mixture contains the solvent, the viscosity during the polymerization can be decreased and also the molecular weight of the vinyl-based polymer can be lowered by chain transfer to the solvent, and thus the viscosity of the finally obtained product comprising the vinyl-based polymer can be further decreased.

The solvent is not specifically limited as long as it is inert at a polymerization temperature and examples thereof include aromatic hydrocarbons such as toluene, xylene, aromatic hydrocarbon mixture (trade name: SOLVESSO™ 150, manufactured by Exxon Chemical Japan Ltd.) and aromatic hydrocarbon mixture (trade name: SOLVESSO™ 100, manufactured by Exxon Chemical Japan Ltd.); ketones such as methyl ethyl ketone and methyl isobutyl ketone; esters such as ethyl acetate, ethyl-3-ethoxypropionate and n-butyl acetate; and alcohols such as isopropanol and n-butanol.

The amount of the solvent is preferably decided according to applications of the finally obtained product comprising the vinyl-based polymer. When the product comprising the vinyl-based polymer may contain the solvent, the material mixture preferably contains the solvent in the amount of 200 parts by mass or less based on 100 parts by mass of the vinyl-based monomer, and the material mixture more preferably contains the solvent in the amount of 25 to 100 parts by mass based on 100 parts by mass of the vinyl-based monomer. When the amount of the solvent is 200 parts by mass or less, sensible heat of the material mixture decreases and the quantity of heated generated during the polymerization per unit material mixture increases. As a result, the polymerization temperature can be maintained easily at 150 to 300° C. When the product comprising the vinyl-based polymer preferably contains no solvent, it is preferred to use no solvent in the polymerization of the vinyl-based polymer.

When the finally obtained product comprising the vinyl-based polymer contains the solvent, it is not necessary to separate and remove the solvent form the vinyl-based polymer after obtaining the vinyl-based polymer. When it is indispensable to contain the solvent so as to smooth the coating film in the application such as coating material, it is preferred to positively use the solvent during the polymerization. Consequently, it becomes unnecessary to perform the process of removing the solvent, which requires much labors and a large amount of energy, and thus the cost required to prepare the vinyl-based polymer is further reduced.

The solvent to be used is preferably selected from the solvents contained in the product comprising the vinyl-based polymer.

For the purpose of adjusting the component, the solvent may be added before a second step described below, during the second step, or after the second step so as to perform blending before shipment of the vinyl-based polymer.

When the solvent is used during the polymerization, the vinyl-based monomer is easily polymerized and the finally obtained product comprising the vinyl-based polymer can be efficiently produced, and thus not only the cost required preparing a vinyl-based polymer but also the cost of the product comprising the vinyl-based polymer can be reduced.

The polymerization temperature of the first reactor in the first step is 150 to 300° C., preferably 160 to 300° C., and more preferably 200 to 280° C. When the polymerization temperature is lower than 150° C., the amount of a thermal initiating radical does not increase and therefore a conversion ratio can not be enhanced. When the conversion ratio can not be increased, productivity of the vinyl-based polymer is decreased, and thus the rate of polymerization must be enhanced by using a large amount of a polymerization initiator. When the polymerization temperature is lower than 150° C., the molecular weight increases and viscosity in the first reactor increases, and thus it becomes impossible to increase the flow rate, and, therefore, the molecular weight must be lowered.

As described above, when the rate of polymerization is enhanced and the molecular weight is lowered at the polymerization temperature of lower than 150° C., a large amount of the polymerization initiator must be added, and, therefore, the cost of the polymerization initiator increases.

When the polymerization temperature exceeds 300° C., a large amount of by-products are produced and the depolymerization speed of the polymer once prepared increases, and thus productivity is lowered. Furthermore, the amount of heat energy to be fed increases and it is not preferred.

The material mixture containing the vinyl-based monomer can be preheated before feeding to the first reactor. When the material mixture is preheated before feeding to the first reactor, even if heating from the exterior of reactor such as jacket heating or internal coil heating is insufficient because of a short retention time in the first reactor, the temperature in the first reactor can be easily controlled to a desired polymerization temperature by sensible heat due to heat generated by the polymerization of the monomer and heat due to preheating. When the feeding temperature of the material mixture is too low, the amount of heat is insufficient unless preheating is not conducted and it may become difficult to control the polymerization temperature.

The preheating temperature of the material mixture is preferably 120° C. or lower. When the preheating temperature is 120° C. or lower, the polymerization of the vinyl-based monomer during preheating can be suppressed. When the material mixture contains the polymerization initiator, the decomposition of the polymerization initiator can be suppressed.

The retention time in the first reactor is 1 to 60 minutes. When the retention time is one or more minutes, the rate of polymerization can be increased to an industrial level and burden of the polymerization in the second step can be reduced. The retention time is preferably 2 or more minutes. Furthermore, when the retention time is 60 minutes or less, the time requires to the first step decreases and therefore it is efficient, and also the amount of unnecessary by-products can be decreased.

In the first step, the polymerization is conducted while controlling the rate of polymerization within a range from 50 to 99%. The polymerization is preferably conducted while controlling the rate of polymerization within a range from 80 to 98%. When the rate of polymerization is less than 50%, the amount of the vinyl-based monomer to be polymerized in the second step increases. As described below, in the second step, since the polymerization is conducted at the polymerization temperature within a range from 100 to 200° C., which is lower than that in the first step, a polymer having a molecular weight larger than that of the polymer obtained in the first step is prepared. In general, viscosity of the polymer does not substantially increase even if the low-molecular weight polymer increases, but increases when a high-molecular weight polymer increases. Therefore, when the amount to be polymerized in the second step increases, viscosity of the finally obtained vinyl-based polymer increases and it may become impossible to stably polymerize. Furthermore, the resulting vinyl-based polymer is not suited for use as coating materials, adhesives, and coating agents.

When the polymerization is conducted while controlling the rate of polymerization to 99% or more, the retention time in the first reactor must be increased. When the retention time is increased in the first reactor, the rate of polymerization increases, but the polymerization speed decreases, and thus the rate of polymerization does not efficiently increase. That is, when the polymerization is conducted until the rate of polymerization exceeds 99%, productivity is lowered.

As do scribed above, the polymerization temperature is selected within a range from 150° to 300° C. and the retention time is selected within a range from 1 to 60 minutes so as to control the rate of polymerization within a range from 50 to 99% in the first step. For example, when the polymerization temperature is 150° C. as the lower limit, the rate of polymerization can be controlled to 50% or more by controlling the retention time to 60 minutes as the upper limit. Furthermore, the rate of polymerization can be controlled within the above range when the polymerization is conducted by further adding a polymerization initiator and a solvent.

The number of tanks in the first reactor is not specifically limited. In case of using one tank, the process becomes simple and plant and equipment investment cost can be reduced. When two or three tanks are arranged in series, productivity can be enhanced.

Examples of the starting-up method of the polymerization in the first step include a method of charging a material mixture in the first reactor at a time and heating (the first method) and a method of continuously feeding a material mixture to the previously heated first reactor (the second method).

The first method is a so-called batch reaction method. In case of starting-up using this method, the amount of the polymerization initiator on starting-up is preferably increased to 120 to 1000% relative to the amount used on a steady operation. An increase in the amount of the polymerization initiator can lower the molecular weight of the polymer prepared at low temperature at the time of initial heating and suppress the formation of a high-molecular weight polymer. As a result, an increase in viscosity can be suppressed. According to this method, after the rate of polymerization has reached a predetermined rate, feed of the material mixture and extraction from the first reactor are initiated and steady continuous polymerization is conducted. According to this method, steady continuous polymerization can be easily stabilized. However, since a vinyl-based polymer having quality different from that of a vinyl-based polymer obtained on the steady operation is prepared on starting-up, the material mixture may be uselessly consumed.

According to the second method, after a material mixture is continuously fed to the previously heated first reactor, the polymerization is rapidly initiated. If the volume of the contents in the reactor exceeds the volume on the steady operation, extraction is initiated and a continuous operation is conducted. According to this method, a vinyl-based polymer having the same quality as that of a vinyl-based polymer obtained on the steady operation can be obtained on starting-up. If the polymerization does not process immediately after the initiation of feed of the material mixture, it becomes difficult to control the polymerization temperature and continuous polymerization may become an unstable state. As a result, since quality of the vinyl-based polymer is not stabilized, the vinyl-based polymer, which does not meet the specification, is prepared and the resulting vinyl-based polymer can not be used as a product.

According to the purposes, starting-up of the polymerization is preferably conducted by any method selected from the above methods.

The second step is conducted after the first step. In the second step, the reaction intermediate mixture and a polymerization initiator are fed to the second reactor, and then the unreacted vinyl-based monomer contained in the reaction intermediate mixture is polymerized in the second reactor.

The polymerization initiator to be fed to the second reactor is the same as the polymerization initiator which can be used in the first step. The amount of the polymerization initiator is 0.01 to 5 parts by mass based on 100 parts by mass of the vinyl-based monomer. When the amount of the polymerization initiator is less than 0.01 parts by mass, the amount of the unreacted vinyl-based monomer can not be sufficiently decreased. When the amount of the polymerization initiator exceeds 5 parts by mass, the cost of the material increases. Therefore, the amount of the unreacted vinyl-based monomer is preferably decreased by increasing the polymerization time and increasing the polymerization temperature such that the amount of the polymerization initiator does not exceeds 5 parts by mass.

The polymerization temperature of the second reactor in the second step is 100° to 200° C. When the polymerization temperature is lower than 100° C., the rate of polymerization decreases and viscosity in the second reactor increases, and therefore, the flow rate decreases. As a result, productivity is lowered. On the other hand, when the polymerization temperature exceeds 200° C., productivity is lowered because by-products are produced.

The retention time in the second reactor is 10 to 240 minutes. When the retention time is less than 10 minutes, the rate of polymerization is not sufficiently improved and thus the amount of the unreacted vinyl-based monomer can not be sufficiently decreased. When the retention time exceeds 240 minutes, the time required to the second step increases and production efficiency is lowered, and also the amount of unnecessary by-products increases. As a result, productivity is lowered.

In the second step, the polymerization is conducted while controlling the rate of polymerization to 80% or more. Preferably, the polymerization is conducted while controlling the rate of polymerization to 90% or more. When the rate of polymerization is 80% or more, not only productivity of the low-molecular weight vinyl-based polymer increases, but also the unreacted monomer content decreases. For example, when the finally obtained vinyl-based polymer is used as a resin for coating material, surface bursting and foaming on the surface of the coating film are suppressed. Also generation of an unpleasant odor is suppressed in other applications.

It is very difficult to control the rate of polymerization to 100% because the speed of polymerization decreases with the increase of the rate of polymerization, and polymerization and depolymerization reactions attain equilibrium. Therefore, it is necessary to remarkably increase the amount of polymerization initiator and to remarkably increase the retention time so as to control the rate of polymerization to 100%, thus resulting in increase of the cost and lowering of productivity. Therefore, the rate of polymerization is more preferably controlled to less than 100%.

As described above, the polymerization temperature, the retention time, and the amount of the polymerization initiator are selected so that the polymerization temperature is within a range from 100° to 200° C., the retention time is within a range from 10 to 240 minutes, and the amount of the polymerization initiator is within a range from 0.01 to 5 parts by mass based on 100 parts by mass of the vinyl-based monomer, in order to control the rate of polymerization to 80% or more in the second step. When the polymerization temperature is 100° C. as the lower limit, the rate of polymerization can be controlled to 80% by selecting the retention time of 240 minutes as the upper limit and selecting the amount of the polymerization initiator of 5 parts by mass as the upper limit. Furthermore, the rate of polymerization can also be controlled within the above range by polymerizing after adding a solvent.

The second reactor used in the second step is not specifically limited and, for example, a batch type tank reactor, a semicontinuous tank reactor, and a continuous tubular reactor can be used.

When a batch type tank reactor is used as the second reactor, the reaction intermediate mixture and a polymerization initiator are charged in the tank reactor at a time, and then the unreacted vinyl-based monomer is polymerized. According to such a polymerization method, the polymerization is simply conducted and the amount of the polymerization initiator decreases as the polymerization proceeds. Therefore, the unreacted vinyl-based monomer content can not be sufficiently decreased in case of a low speed of polymerization. Therefore, the polymerization temperature and the amount of the polymerization initiator are preferably controlled within the above range so as to increase the speed of polymerization.

When a semicontinuous tank reactor is used as the second reactor, the reaction intermediate mixture is charged in the tank reactor at a time and the polymerization is conducted while feeding a polymerization initiator to the tank reactor. According to such a polymerization method, the amount of the polymerization initiator does not become insufficient even if the speed of polymerization is comparatively low because the polymerization initiator is successively added, and thus the amount of the unreacted vinyl-based monomer can be sufficiently decreased. As a result, productivity is improved and the cost is reduced. A general semicontinuous tank type reaction in which the polymerization is conducted while feeding the reaction intermediate mixture and the polymerization initiator to the tank reactor is also effective by the same reason.

When a continuous tubular reactor is used as the second reactor, the polymerization is continuously conducted while continuously feeding the reaction intermediate mixture and a polymerization initiator to the tubular reactor. This method is suited for the case that the speed of polymerization is high. According to this polymerization method, it is preferred that the polymerization initiator is added from the midpoint of the tubular reactor, thereby to improve the rate of polymerization and to further decrease the amount of the unreacted vinyl-based monomer. When the polymerization initiator is added to further decrease the amount of the unreacted vinyl-based monomer, productivity is improved and the cost is further reduced.

As described above, since each rector used in the second reactor has a specific feature, the reactor is preferably selected according to the purposes.

After the completion of the second step, a vinyl-based polymer having a mass average molecular weight of 1500 to 10000 can be obtained. When the mass average molecular weight of the vinyl-based polymer is within the above range, viscosity can be decreased without using the solvent and the resulting vinyl-based polymer can be preferably used in coating materials, adhesives, and coating agents. On the other hand, when the mass average molecular weight of the vinyl-based polymer is less than 1500, the resulting vinyl-based polymer has not various uses and a polymerization apparatus may not be simple. When the mass average molecular weight exceeds 10000, the resulting vinyl-based polymer is not suited for use in coating materials, adhesives, and coating agent.

According to the present invention, it is made possible to efficiently prepare a vinyl-based polymer having low molecular weight and high rate of polymerization with less unreacted monomer content. That is, a low-molecular weight vinyl-based polymer, which causes less surface bursting and foaming on the surface of a coating film and is suited for use in coating materials, adhesives and coating agents, can be obtained at low cost with high productivity without using a special apparatus for removing the unreacted monomer.

When the material mixture contains the polymerization initiator in the amount within a range from 0.01 to 12 parts by mass, and preferably from 0.1 to 10 parts by mass, based on 100 parts by mass of the vinyl-based monomer, the effect of lowering the molecular weight of the vinyl-based polymer and enhancing the rate of polymerization is sufficiently exerted and also the cost of the polymerization initiator can be reduced.

When the material mixture contains the solvent in the amount within a range from 200 parts by mass or less, and preferably 25 to 100 parts by mass, based on 100 parts by mass of the vinyl-based monomer, viscosity on polymerization can be decreased and the molecular weight of the vinyl-based polymer can be further lowered by the chain transfer effect to the solvent. Therefore, the vinyl-based polymer can be prepared in a stable manner. As a result, the low-molecular weight vinyl-based polymer is prepared more efficiently and the production cost is further reduced.

When the polymerization temperature in the first step is 200° to 280° C., the amount of a thermal initiating radical further increases and the amount of the polymerization initiator can be decreased. Also the production of by-products can be suppressed and depolymerization is suppressed, and thus the rate of polymerization can be further increased and the amount of the unreacted vinyl-based monomer can be further decreased.

When the vinyl-based monomer is polymerized so that the rate of polymerization in the first step is controlled within a range from 80 to 98%, the amount of the high-molecular weight vinyl-based polymer produced during the polymerization in the second step can be decreased while maintaining high productivity.

When a batch type tank reactor is used as the second reactor and, especially, the polymerization is conducted while successively adding a polymerization initiator, the amount of the unreacted vinyl-based monomer can be efficiently reduced even if the polymerization is conducted at comparatively low speed of polymerization. When a continuous tubular reactor is used as the second reactor, the polymerization can be continuously conducted in a stable manner and thus productivity of the second step can be further improved.

When the material mixture is continuously fed to the first reactor after preheating, the polymerization temperature in the first step can be stably controlled.

When the vinyl-based monomer is a styrene-based monomer and/or an acryl-based monomer, the finally obtained vinyl-based polymer can be preferably used in coating materials, adhesives, and coating agents.

The thermosetting coating composition of the present invention is obtained by mixing a polymer solution (A) containing, as a main component, a vinyl-based polymer having a mass average molecular weight of 2000 to 7000 and having an epoxy group, a residual vinyl group-containing monomer content being 1% by mass or less, a resin solid content being from 50 to 90% by mass, with a polymer solution (B) containing, as a main component, a vinyl-based polymer having a mass average molecular weight of 2000 to 7000 and having a carboxyl group and/or an acid anhydride group, a residual vinyl group-containing monomer content being 1% by mass or less, a resin solid content being from 50 to 90% by mass.

As used herein, the "main component" in the polymer solution is defined as a component in which the content in the polymer solution is 50% by mass or more.

In the thermosetting coating composition of the present invention, the vinyl-based polymer constituting the polymer solution (A) preferably has an epoxy equivalent weight of 250 to 500 g/eq and a glass transition temperature (Tg) of 10° to 50° C. Additionally, it is preferred that the vinyl-based polymer has a vinyl-based monomer unit having a hydroxyl group and has a hydroxyl group equivalent weight of 250 to 2500 g/eq.

It is preferred that the vinyl-based polymer constituting the polymer solution (B) has an acid equivalent weight of 250 to 500 g/eq and a glass transition temperature (Tg) of 20° to 70° C.

As used herein, the "epoxy equivalent weight" is defined by the number of grams of a resin having an equivalent weight of an epoxy group, and the "hydroxyl group equivalent weight" is defined by the number of grams of a resin having an equivalent weight of a hydroxyl group. The "acid equivalent weight" is defined by the number of grams of a resin having an equivalent weight of a carboxyl group or an acid anhydride group.

In the thermosetting coating composition of the present invention, the amount of the polymer solution (A) is preferably 10 to 85 parts by mass, the amount of the polymer solution (B) is preferably 10 to 85 parts by mass, and the total amount of the polymer solution (A) and the polymer solution (B) is preferably 50 to 99 parts by mass, based on 100 parts by mass of the total amount of the composition. It is preferred that the thermosetting coating composition of the present invention further contains an auxiliary curing agent (C) and the amount of auxiliary curing agent (C) is 1 to 50 parts by mass based on 100 parts by mass of the total amount of the composition.

In the thermosetting coating composition of the present invention, the polymer solution (A) and/or the polymer solution (B) are preferably obtained by continuously feeding 50 to 95 parts by mass of a monomer component and 50 to 5 parts by mass of a solvent in a reactor and reacting at a temperature within a range from 150° to 300° C.

In the thermosetting coating composition of the present invention, the polymer solution (A) and/or the polymer solution (B) are preferably obtained by using a polymerization initiator in the amount of 0.01 to 8 parts by mass based on 100 parts by mass of the total amount of the vinyl-based monomer.

The coating material of the present invention comprises the above-described thermosetting coating composition of the present invention.

The present invention will now be described in detail.

[Thermosetting Coating Composition]

The thermosetting coating composition of the present invention is obtained by mixing a polymer solution (A) containing an epoxy group-containing vinyl-based copolymer as a main component with a polymer solution (B) containing a carboxyl group and/or acid anhydride group-containing vinyl-based copolymer as a main component.

(Polymer Solution (A))

The vinyl-based copolymer as the main component of the polymer solution (A) has at least an epoxy group-containing vinyl-based monomer unit (a-1).

Examples of the monomer unit (a-1) include glycidyl (meth)acrylate, methylglycidyl (meth)acrylate, 3,4-epoxycyclohexylmethyl (meth)acrylate, glycidyl allyl ether, oxocyclohexylmethyl (meth)acrylate, 3-glycidyloxypropyl (meth)acrylate, 3-glycidyloxybutyl (meth)acrylate, 4-glycidyloxybutyl (meth)acrylate, 6-glycidyloxyhexyl (meth)acrylate, 8-glycidyloxyoctyl (meth)acrylate, 9-glycidyloxynonyl (meth)acrylate, 2-glycidyloxyethyl (meth)acrylate, 2-glycidyloxypropyl (meth)acrylate, and 2-glycidyloxybutyl (meth)acrylate. These monomer units can be used alone or in combination, if necessary.

The content of the epoxy group-containing vinyl-based monomer unit (a-1) in the vinyl-based copolymer is preferably 20 to 70% by mass, and more preferably from 25 to 60% by mass, based on 100% by mass of the entire monomer units. When the content of the epoxy group-containing vinyl-based monomer (a-1) is 20% by mass or more, a composition having excellent curability at low temperature is obtained and a coating film having excellent hardness and solvent resistance is obtained. When the content of the epoxy group-containing vinyl-based monomer (a-1) is 70% by mass or less, a composition having excellent storage stability is obtained and also a coating film having excellent thermal yellowing resistance is obtained.

The epoxy equivalent weight of the vinyl-based copolymer is preferably 250 to 500 g/eq, and more preferably 270 to 480 g/eq. When the epoxy equivalent weight of the vinyl-based copolymer is 250 g/eq or more, a composition having excellent storage stability is obtained. When the epoxy equivalent weight is 500 g/eq or less, a composition having excellent curability at low temperature is obtained and a coating film having satisfactory hardness is obtained.

The vinyl-based copolymer preferably contains a vinyl-based monomer unit (a-2) having a hydroxyl group, in addition to an epoxy group-containing vinyl-based monomer (a-1). The content of the vinyl-based monomer unit (a-2) having a hydroxyl group is preferably 5 to 50% by mass, and more preferably 10 to 40% by mass, based on 100% by mass of the entire monomer units. When the content of the vinyl-based monomer unit (a-2) having a hydroxyl group is 5% by mass or more, a composition having excellent curability at low temperature is obtained. On the other hand, when the content is 50% by mass or less, it composition having sufficient compatibility and excellent curability at low temperature is obtained, and also a coating film having satisfactory thermal yellowing resistance and water resistance is obtained.

The vinyl-based copolymer has the vinyl-based monomer unit (a-2) having a hydroxyl group and the hydroxyl group equivalent weight is preferably 250 to 2500 g/eq, and more preferably 350 to 1500 g/eq. When the hydroxyl group equivalent weight of the vinyl-based copolymer is 250 g/eq or more, a composition having sufficient compatibility and excellent curability at low temperature is obtained and also a coating film having excellent thermal yellowing resistance and water resistance is obtained. When the hydroxyl group equivalent weight is 2500 g/eq or less, a composition having excellent curability at low temperature is obtained.

Examples of the vinyl-based monomer unit (a-2) having a hydroxyl group suited for use as the vinyl-based copolymer include (meth)acrylate esters having a hydroxyalkyl group, such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, and 6-hydroxyhexyl (meth)acrylate; (meth)acrylate esters having a hydroxyl group at terminals, such as ring-opening adduct of ε-caprolactone or γ-butyrolactone to 2-hydroxyethyl (meth)acrylate (for example, PLACCEL F monomer manufactured by Daicel Chemical Industries, Ltd., or TONE M monomer manufactured by UCC Co.), ring-opening adduct of ethylene oxide to methacrylic acid, ring-opening adduct of propylene oxide to methacrylic acid, and dimer or trimer of 2-hydroxyethyl (meth)acrylate or 2-hydroxypropyl (meth)acrylate; and 4-hydroxybutyl vinyl ether and p-hydroxystyrene. These vinyl-based monomer units can be used alone or in combination, if necessary. Among these monomer units, 2-hydroxyethyl (meth)acrylate, 4-hydroxybutyl (meth)acrylate, and 6-hydroxyhexyl (meth)acrylate are particularly preferable.

The vinyl-based copolymer may have the other vinyl-based monomer unit (a-3), in addition to the monomer units (a-1) and (a-2). The content of the other vinyl-based monomer unit (a-3) is decided according to the amount of the monomer units (a-1) and (a-2) required.

Examples of the other vinyl-based monomer unit (a-3) include (meth)acrylate esters having a linear or branched aliphatic hydrocarbon substituent, such as methyl (meth)acrylate, ethyl (meth)acrylate, n-propyl (meth)acrylate, n-butyl (meth)acrylate, i-butyl (meth)acrylate, t-butyl (meth)acrylate, sec-butyl (meth)acrylate, n-pentyl (meth)acrylate, 2-ethylhexyl (meth)acrylate, decyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, isodecyl (meth)acrylate, and 2-hexyldecanyl (meth)acrylate; (meth)acrylate esters having an alicyclic hydrocarbon substituent, such as cyclohexyl (meth)acrylate, norbornyl (meth)acrylate, isoboronyl (meth)acrylate, and dicyclopentanyl (meth)acrylate; styrene derivatives such as styrene, o-methylstyrene, m-methylstyrene, p-methylstyrene, α-methylstyrene, p-ethylstyrene, 2,4-methylstyrene, p-n-butylstyrene, p-t-butylstyrene, p-n-hexylstyrene, p-n-octylstyrene, p-n-nonylstyrene, p-n-dodecyltyrene, and p-phenylstyrene; ethylenically unsaturated nitriles such as acrylonitrile and methacrylonitrile; N-alkoxy-substituted amides such as N-methoxymethylacrylamide, N-ethoxymethylacrylamide, and N-butoxymethylacrylamide; vinyl basic monomers such as dimethylaminoethyl (meth)acrylate and diethylaminoethyl (meth)acrylate; and unsaturated aliphatic dibasic acid dialkyl esters such as dimethyl maleate, diethyl maleate, dibutyl maleate, dimethyl fumarate, diethyl fumarate, and dibutyl fumarate. These monomer units can be used alone or in combination.

Among these monomer units, n-butyl (meth)acrylate, i-butyl (meth)acrylate, t-butyl (meth)acrylate, 2-ethylhexyl (meth)acrylate, dodecyl (meth)acrylate, tridecyl (meth)acrylate, tetradecyl (meth)acrylate, cyclohexyl (meth)acrylate, isoboronyl (meth)acrylate, and styrene are preferable. Among these monomer units, i-butyl (meth)acrylate, 2-ethylhexyl (meth)acrylate, dodecyl (meth)acrylate, tridecyl (meth)acrylate, and tetradecyl (meth)acrylate are particularly preferable because a coating film having excellent smoothness is obtained. Since a coating film having high hardness is obtained, styrene, cyclohexyl (meth)acrylate, and isoboronyl (meth)acrylate are preferable.

In the thermosetting coating composition of the present invention, the mass average molecular weight of the vinyl-based copolymer having an epoxy group is 2000 to 7000. The mass average molecular weight is preferably 2,100 to 5,000, and more preferably 2200 to 4800. When the mass average molecular weight of the vinyl-based copolymer is 2000 or more, a composition having excellent curability at low temperature is obtained. When the mass average molecular weight is 7000 or less, the viscosity becomes comparatively low and thus a composition suited for use as a coating material having low viscosity and high solid content is obtained.

The glass transition temperature (Tg) of the vinyl-based copolymer is preferably 10° to 50° C., and more preferably 15° to 49° C. When the glass transition temperature is 10° C. or higher, a coating film having good hardness and scratch resistance is obtained. When the glass transition temperature is 50° C. or lower, a composition having excellent toughness and storage stability of the coating film is obtained.

In the present invention, the amount of the residual unreacted vinyl group-containing monomer is 1% by mass or less based on 100% by mass of the total amount of the polymer solution (A). The amount of the residual unreacted vinyl group-containing monomer is preferably 0.5% by mass or less.

When a large amount of the unreacted monomer is remained, surface bursting occurs during the formation of a coating film and bubbles are generated to form pinholes. Therefore, it may become difficult to form a uniform coating film and physical properties of the coating film may be deteriorated. When the amount of the residual unreacted vinyl group-containing monomer is 1% by mass or less, these problems are not caused and thus a composition having less surface bursting during the formation of a coating film is obtained and a uniform coating film is obtained.

The resin solid content of the polymer solution (A) is 50 to 90% by mass. The resin solid content is preferably 55 to 85% by mass, and more preferably 60 to 80% by mass. When the resin solid content of the polymer solution (A) is 50% by mass or more, the amount of the solvent used is small and it is possible to meet the high solid-requirement. On the other hand, when the resin solid content is 90% by mass or less, the copolymer solution has sufficiently low viscosity and is easily handled.

The polymer solution (A) is preferably prepared by using a polymerization initiator in the amount within a range from 0.01 to 8 parts by mass, preferably from 0.1 to 4 parts by mass, and more preferably from 0.2 to 3.5 parts by mass, based on 100 parts by mass of the total amount of the vinyl-based monomer. When the amount of the polymerization initiator used in the preparation (polymerization) is 0.01 part by mass or more, it becomes easy to lower the molecular weight of the polymer. Therefore, a composition suited for use as a material for coating material having low viscosity and high solid content is obtained and also a uniform coating film having good appearance is obtained. When the amount of the polymerization initiator is 8 parts by mass or less, a coating film heaving satisfactory thermal yellowing resistance, acid resistance, water resistance, solvent resistance, weatherability, toughness, scratch resistance, and hardness is obtained.

(Polymer Solution (B))

The vinyl-based copolymer as the main component of the polymer solution (B) has at least a vinyl-based monomer unit (b-1) having a carboxyl group and/or an acid anhydride group. By mixing with the polymer solution (B), the composition can be cured by the crosslinking reaction of a carboxyl group and/or an acid anhydride group in the vinyl-based copolymer with an epoxy group or a hydroxyl group of the vinyl-based copolymer in the polymer solution (A).

Examples of the vinyl-based monomer unit (b-1) having a carboxyl group and/or an acid anhydride group include carboxyl group-containing $\alpha,\beta$-unsaturated vinyl-based monomers such as methacrylic acid, acrylic acid, crotonic acid, vinylbenzoic acid, fumaric acid, itaconic acid, and maleic acid; $\beta$-(meth)acryloxyethylacid succinate, $\beta$-(meth)acryloxyethylacid maleate, $\beta$-(meth)acryloxyethylacid phthalate, $\beta$-(meth)acryloxyethylhexahydrophthalate, or $\gamma$-(meth)acryloxypropylacid succinate; long-chain carboxyl group-containing vinyl monomers such as semiesterification reaction product of caprolactone-modified hydroxyl group-containing (meth)acrylate ester (for example, succinic acid monoester, phthalic acid monoester or anhydrous hexahydrophthalic acid monoester), in which a carboxyl group is introduced into terminals by esterifying a terminal hydroxyl group of a ring-opening adduct of $\epsilon$-caprolactone or $\gamma$-butyrolactone to 2-hydroxyethyl (meth)acrylate (for example, PLACCEL F monomer manufactured by Daicel Chemical Industries, Ltd., or TONE M monomer manufactured by UCC Co.) with succinic anhydride, phthalic anhydride, or hexahydrophthalic anhydride, and acid anhydride compound; vinyl-based monomers having an $\alpha,\beta$-dicarboxylic anhydride group, such as maleic anhydride, itaconic anhydride, citraconic anhydride, and 2,3-dimethylmaleic anhydride; and vinyl-based monomers having a dicarboxylic acid monoester group, such as monomethyl maleate, monoethyl maleate, monobutyl maleate, monooctyl maleate, monooctyl itaconate, monobutyl fumarate, mono-2-ethylhexyl fumarate, and monoethyl citraconate. These vinyl-based monomer units can be used alone or in combination, if necessary.

It is particularly preferred that a monomer unit containing an $\alpha,\beta$-dicarboxylic anhydride group and a monomer unit containing a monoesterifying group of an $\alpha,\beta$-dicarboxylic anhydride group coexist. Such a polymer can be obtained by the following procedure.

For example, a monomer containing an $\alpha,\beta$-dicarboxylic acid anhydride group is copolymerized with the other vinyl-based monomer (b-2) described below and then an acid anhydride group is partially ring-opened with an alkanol, and thus the acid anhydride group and its monoesterifying group can coexist and a polymer having a monomer unit containing an $\alpha,\beta$-dicarboxylic anhydride group and a monomer unit containing a monoesterifying group of an $\alpha,\beta$-dicarboxylic anhydride group can be obtained. According to this method, the amount of the acid anhydride group to be remained can be controlled by controlling the amount of the alkanol to be added.

Examples of the alkanol suited for use so as to monoesterify the acid anhydride group include methanol, ethanol, i-propanol, t-butanol, i-butanol, n-butanol, methyl cellsolve, ethyl cellsolve, dimethylaminoethanol, diethylaminoethanol, acetol, propargyl alcohol, and allyl alcohol. These alkanols can be used alone or in combination, if necessary. Among these alkanols, methanol and ethanol are preferable. The acid anhydride group can be monoesterified by using in combination with reaction catalyst, for example, quaternary ammonium salts such as tetrabutylammonium and tertiary amines such as triethylamine, if necessary.

The polymer having a monomer unit containing an $\alpha,\beta$-dicarboxylic anhydride group and a monomer unit containing a monoesterifying group of an $\alpha,\beta$-dicarboxylic anhydride group can also be obtained by copolymerizing a monomer containing an α,β-dicarboxylic acid anhydride group, a monomer containing a monoesterifying group of an α,β-dicarboxylic anhydride group, and the other vinyl-based monomer (b-2) described below.

In the vinyl-based polymer, the content of the vinyl-based monomer unit (b-1) containing a carboxyl group and/or an acid anhydride group is preferably 10 to 70% by mass, more preferably 17 to 60% by mass, and particularly preferably 20 to 55% by mass, based on 100% by mass of the entire monomer units. When the content of the monomer unit (b-1) is 10% by mass or more, a composition having excellent curability at low temperature is obtained. When the content is 60% by mass or less, a composition having excellent storage stability is obtained and also a coating film having excellent water resistance is obtained.

The acid equivalent weight of the vinyl-based copolymer is preferably 250 to 500 g/eq, and more preferably 270 to 480 g/eq. When the acid equivalent weight of the vinyl-based copolymer is 250 g/eq or more, a composition having excellent rage stability is and also a coating film having excellent water resistance is obtained. When the acid equivalent weight is 500 g/eq or less, a composition having excellent curability at low temperature is obtained.

The vinyl-based copolymer may have the other vinyl-based monomer unit (b-2), in addition to the vinyl-based monomer unit (b-1) containing a carboxyl group and/or an acid anhydride group. The content of the other vinyl-based monomer unit (b-2) is determined according to the amount of the monomer unit (b-1) required.

Examples of the other vinyl-based monomer unit (b-2) include (meth)acrylate esters containing a linear or branched aliphatic hydrocarbon substituent, such as methyl (meth)acrylate, ethyl (meth)acrylate, n-propyl (meth)acrylate, n-butyl (meth)acrylate, i-butyl (meth)acrylate, t-butyl (meth)acrylate, sec-butyl (meth)acrylate, n-pentyl (meth)acrylate, 2-ethylhexyl (meth)acrylate, decyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, isodecyl (meth)acrylate, and 2-hexyldecanyl (meth)acrylate; (meth)acrylate esters containing an alicyclic hydrocarbon substituent, such as cyclohexyl (meth)acrylate, norbornyl (meth)acrylate, isoboronyl (meth)acrylate, and dicyclopentanyl (meth)acrylate; styrene derivatives such as styrene, o-methylstyrene, m-methylstyrene, p-methylstyrene, α-methylstyrene, p-ethylstyrene, 2,4-dimethylstyrene, p-n-butylstyrene, p-t-butylstyrene, p-n-hexylstyrene, p-n-octylstyrene, p-n-nonylstyrene, p-n-dodecyltyrene, and p-phenylstyrene; ethylenically unsaturated nitriles such as acrylonitrile and methacrylonitrile; N-alkoxy-substituted amides such as N-methoxymethylacrylamide, N-ethoxymethylacrylamide, and N-butoxymethylacrylamide; vinyl basic monomers such as dimethylaminoethyl (meth)acrylate and diethylaminoethyl (meth)acrylate; and unsaturated aliphatic dibasic acid dialkyl esters such as dimethyl maleate, diethyl maleate, dibutyl maleate, dimethyl fumarate, diethyl fumarate, and dibutyl fumarate. These monomer units can be used alone or in combination, if necessary.

When the monomer containing an acid anhydride group is not used as the vinyl-based monomer unit (b-1), there can be used (meth)acrylate esters containing a hydroxyalkyl group, such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, and 6-hydroxyhexyl (meth)acrylate; (meth)acrylate esters containing a hydroxyl group at terminals, such as ring-opening adduct of ε-caprolactone or γ-butyrolactone to 2-hydroxyethyl (meth)acrylate (for example, PLACCEL F monomer manufactured by Daicel Chemical Industries, Ltd., or TONE M monomer manufactured by UCC Co.), ring-opening adduct of ethylene oxide to methacrylic acid, and ring-opening adduct of propylene oxide to methacrylic acid, and dimer or trimer of 2-hydroxyethyl (meth)acrylate or 2-hydroxypropyl (meth)acrylate; and other hydroxyl group-containing vinyl-based monomers such as 4-hydroxybutyl vinyl ether and p-hydroxystyrene. These monomer units can be used alone or in combination, if necessary.

Among these monomer units, n-butyl (meth)acrylate, i-butyl (meth)acrylate, t-butyl (meth)acrylate, 2-ethylhexyl (meth)acrylate, dodecyl (meth)acrylate, tridecyl (meth)acrylate, tetradecyl (meth)acrylate, cyclohexyl (meth)acrylate, isoboronyl (meth)acrylate, and styrene are preferable. Among these monomer units, i-butyl (meth)acrylate, 2-ethylhexyl (meth)acrylate, dodecyl (meth)acrylate, tridecyl (meth)acrylate, and tetradecyl (meth)acrylate are particularly preferable because a coating film having excellent smoothness is obtained. Furthermore, styrene, cyclohexyl (meth)acrylate, and isoboronyl (meth)acrylate are preferable because a coating film having high hardness is obtained.

In the present invention, the mass average molecular weight of the vinyl-based polymer containing a carboxyl group and/or an acid anhydride group is 2000 to 7000. The mass average molecular weight is preferably 2100 to 6900, and more preferably 2200 to 5000. When the mass average molecular weight of the vinyl-based polymer is 2000 or more, a composition having excellent curability at low temperature is obtained. When the mass average molecular weight of the vinyl-based polymer is 7000 or less, the viscosity becomes comparatively low and thus a composition suited for use as a coating material having low viscosity and high solid content is obtained. Furthermore, a composition having excellent storage stability is obtained.

The pass transition temperature (Tg) of the vinyl-based copolymer is preferably 20° to 70° C., and more preferably 25° to 69° C. When the glass transition temperature is 20° C. or higher, a coating film having satisfactory hardness and scratch resistance is obtained. When the glass transition temperature is 70° C. or lower, a coating film having excellent toughness is obtained.

In the present invention, the amount of the residual unreacted vinyl group-containing monomer is 1% by mass or less based on 100% by mass of the total amount of the polymer solution (B). The amount of the residual unreacted vinyl group-containing monomer is preferably 0.5% by mass or less. When the amount of the residual unreacted vinyl group-containing monomer is 1% by mass or less, a composition causing less surface bursting during the formation of a coating film is obtained and also a uniform coating film is obtained.

The resin solid content of the polymer solution (B) is 50 to 90% by mass. The resin solid content is preferably 55 to 85% by mass, and more preferably 60 to 80% by mass. When the resin solid content of the polymer solution (B) is 50% by mass or more, the amount of the solvent used is small and it is possible to meet the high solid-requirement. On the other hand, when the resin solid content is 90% by mass or less, the copolymer solution has sufficiently low viscosity and is easily handled.

The polymer solution is preferably prepared by using a polymerization initiator in the amount within a range from 0.01 to 8 parts by mass, preferably from 0.1 to 4 parts by mass, and more preferably from 0.2 to 3.5 parts by mass, based on 100 parts by mass of the total amount of the vinyl-based monomer. When the amount of the polymerization initiator used in the preparation (polymerization) is 0.01 part by mass or more, it becomes easy to lower the molecular weight of the polymer and thus a composition suited for use as a material for coating material having low viscosity and high solid content is obtained and also a uniform coating film having good appearance is obtained. When the amount of the polymerization initiator is 8 parts by mass or less, a coating film having satisfactory thermal yellowing resistance, acid resistance, water resistance, solvent resistance, weatherability, toughness, scratch resistance and hardness is obtained.

(Method for Preparation of Polymer Solution (A), Polymer Solution (B))

The polymer solutions (A) and (B) used in the thermosetting coating composition of the present invention can be prepared by known polymerization methods such as solution polymerization method, block polymerization method, and emulsion polymerization method. Among these methods, a solution polymerization method is preferably employed.

Among solution polymerization methods a method in which solution polymerization is conducted by a continuous polymerization system of continuously feeding a mixture of a monomer component and a solvent in a reactor, and a polymer solution is prepared by treating without separating the unreacted monomer is preferred because the method is excellent in production cost and production efficiency and a coating film having excellent acid resistance and thermal yellowing resistance is obtained. It is particularly preferred to prepare the polymer solution under the conditions described above.

When the continuous polymerization system is employed, a vinyl-based monomer mixture is copolymerized in the presence of a solvent, a polymerization initiator and, if necessary, a polymerization chain transfer agent. When the reaction is conducted, the amount of the monomer component is preferably 50 to 95 parts by mass and the amount of the solvent is preferably 50 to 5 parts by mass, based on 100 parts by mass of the total amount of the monomer component and the solvent.

Examples of the solvent suited for use in case of employing the continuous polymerization system include aromatic hydrocarbons such as toluene and xylene; ketones such as methyl ethyl ketone and methyl isobutyl ketone; and esters such as ethyl acetate, n-butyl acetate, and propylene glycol monomethyl ether acetate. When the constituent unit of the copolymer (B) does not contain the monomer comprising an α,βdicarboxylic acid anhydride group, alcohols such as isopropanol and n-butanol can also be used.

As the polymerization initiator, known polymerization initiators can be preferably used, and examples thereof include 2,2-azobisisobutyronitrile, 2,2-azobis(2,4-dimethylvaleronitrile), 2,2-azobis(2-methylbutyronitrile), benzoyl peroxide, cumenehydroperoxide, lauryl peroxide, di-t-butyl peroxide, and t-butylperoxy-2-ethylhexanoate.

When the continuous polymerization system is employed, continuous polymerization is preferably conducted at a temperature of 150 to 300° C. for 1 to 30 minutes as a retention time. Continuous polymerization at 150° C. or higher can reduce the residual monomer content in the copolymer solution to be prepared. As a result, a composition causing less surface bursting during the formation of a coating film can be obtained and also a uniform coating film can be formed. Continuous polymerization at 300° C. or lower can suppress thermal decomposition of the copolymer to be prepared.

Continuous polymerization for one or more minutes as a retention time can reduce the residual monomer content in the copolymer solution to be prepared. As a result, a composition causing less surface bursting during the formation of a coating film can be obtained and also a uniform coating film can be formed. Continuous polymerization for 30 minutes or less as a retention time can suppress change in quality and deterioration of the copolymer due to heat, and thus acid resistance and thermal yellowing resistance of the coating film can be improved.

In the thermosetting coating composition of the present invention, the amount of the polymer solution (A) is preferably 10 to 85 parts by mass and the amount of the polymer solution (B) is preferably 10 to 85 parts by mass, based on 100 parts by mass of the total amount of the composition. The amount of the polymer solution (A) is more preferably 20 to 80 parts by mass and the amount of the polymer solution (B) is more preferably 20 to 80 parts by mass. As described above, by mixing the polymer solutions (A) and (B), a composition having excellent curability at low temperature is obtained and a coating film having good hardness, acid resistance, and solvent resistance is obtained.

In the thermosetting coating composition of the present invention, the total amount of the polymer solutions (A) and (B) is preferably 50 to 99 parts by mass based on 100 parts by mass of the total amount of the composition. The total amount of the polymer solutions (A) and (B) is more preferably 60 to 98 parts by mass. When the total amount of the polymer solutions (A) and (B) is 50 parts by mass or more, a coating film having good acid resistance, crosslinking density, weatherability, water resistance, and appearance is obtained.

To the thermosetting coating composition of the present invention, an auxiliary curing agent (C) comprising a compound or resin containing a functional group capable of reacting with at least one of epoxy group, carboxyl group, acid anhydride group, and hydroxyl group may be optionally added so as to further improve crosslinking density and appearance of the resulting coating film.

The amount of the auxiliary curing agent (C) to be added is preferably 1 to 50 parts by mass, and more preferably 2 to 40 parts by mass, based on 100 parts by mass of the total amount of the composition. When the amount of the auxiliary curing agent (C) is 1 part by mass or more, the effect of improving crosslinking density and appearance of the resulting coating film is exerted. When the amount is 50 parts by mass or less, a composition having excellent storage stability is obtained and also a coating film having good acid resistance and thermal yellowing resistance is obtained.

Examples of the auxiliary curing agent (C) include melamine-based resin and block isocyanate-based resin, and also glycidyl ether compound, glycidyl ester compound, epoxy compounds such as alicyclic epoxy compound, polybasic acid compounds such as adipic acid and phthalic acid, and polyester resin which contains a carboxyl group in the molecule and also has a solid acid value of 50 to 200 mgKOH/g (that is, acid equivalent weight: 2801) 1120 g/eq). These auxiliary curing agents can be used alone or in combination.

In the thermosetting coating composition of the present invention, a molar ratio (epoxy group/carboxyl group) of an epoxy group of the vinyl-based copolymer in the polymer solution (A) to a carboxyl group of the vinyl-based copolymer in the polymer solution (B) is preferably 1/5 to 5/1, more preferably 1/4 to 4/1, and particularly preferably 1/3 to 3/1. With such a composition, since the content of the unreacted functional group during the formation of a coating film is decreased without using in combination with the auxiliary curing agent (C), a coating film having high crosslinking density and excellent water resistance and weatherability is obtained.

For the purpose of improving curability, a curing agent can also be added to the thermosetting coating composition of the present invention. As the curing catalyst, for example, there can be used known catalysts such as quaternary ammonium salt and quaternary phosphonium salt used in the esterification reaction of an acid group with an ester group. Specific examples thereof include benzyltrimethylammonium chloride, benzyltrimethylammonium bromide, tetrabutylammonium chloride, tetrabutylammonium bromide, tetrabutylammonium hydroxide, benzyltriphenylphosphonium chloride, and benzyltriphenylphosphonium bromide.

For the purpose of improving storage stability, acid compounds typified by sulfonic acid and phosphoric acid or blocked compounds thereof may be optionally added to the thermosetting coating composition of the present invention. Specific examples thereof include paratoluenesulfonic acid, dodecylbenzenesulfonic acid, dinonylnaphthalenesulfonic acid, and amine blocked compounds thereof, monoalkylphosphoric acid, dialkylphosphoric acid, and monoalkylphosphorous acid.

Additives, for example, rheology modifiers such as organic bentone, polyamide, microgel, and cellulose-based resin; surface modifiers typified by silicone; ultraviolet absorbers; photostabilizers; antioxidants; and anti-sag agents can be optionally added to the thermosetting coating composition of the present invention.

[Coating Material]

The Coating material of the present invention is composed of the above-described thermosetting coating composition of the present invention and is useful for top coating of automobiles.

When the coating material of the present invention is used for top coating of automobiles, the coating material of the present invention may be used for base coating and a known coating material for base coating may also be used.

Examples of the known coating material for base coating include those containing an acryl-melamine-based thermosetting resin. For example, there is known a coating material for base coating, comprising an acryl-melamine-based thermosetting resin, a diluent such as volatile organic solvent, a curing agent such as amino resin or polyisocyanate compound, a brightening agent such as aluminum paste, mica, or micaceous iron oxide, an inorganic or organic pigment such as titanium oxide, carbon black, or quinacridone, an additive resin such as polyester resin, epoxy resin, or cellulose resin, and additives such as surface modifier, ultraviolet absorber, and antioxidant.

As the base or top coating method, for example, there can be preferably employed a so-called two coat/one bake curing method comprising applying a coating material for base coating, applying a coating material for top coating (coating material of the present invention) without curing the coating material for base coating with firing, and simultaneously curing both coating films.

When an aqueous coating material is used as a base coating material, good appearance can be obtained. Therefore, it is preferred that the base coating material is previously semicured by heating at 60 to 100° C. for about 1 to 10 minutes before top coating. Examples of the aqueous base coating material include those described in U.S. Pat. No. 5,151,125 and U.S. Pat. No. 5,183,504.

The thermosetting coating composition and coating material of the present invention are obtained by mixing a polymer solution (A) containing a specific epoxy group-containing vinyl-based copolymer as a main component with a polymer solution (B) containing a specific carboxyl group and/or acid anhydride group-containing vinyl-based copolymer as a main component and are therefore excellent in curability at low temperature and storage stability and cause less surface bursting during the formation of a coating film, and is also capable of forming a coating film which is excellent in hardness, toughness, crosslinking density, acid resistance, thermal yellowing resistance, weatherability, water resistance, solvent resistance, and scratch resistance and are suited for use as a coating material for top coating of automobiles. The thermosetting coating composition and coating material of the present invention can meet the high solid-requirement and are environmentally friendly.

EXAMPLES

The present invention will now be described in detail by way of examples

Evaluation Items of Vinyl-based Polymer and Evaluation Method

Examples 1 to 9, Comparative Example 1

<Measurement of Molecular Weight>

The molecular weight was measured by the following gel permeation chromatography (GPC). As a polystyrene standard sample, the following samples each having a molecular weight within a range from 6200000 to 500 (total 12 kinds of samples, manufactured by Tosoh Corporation) were used. The molecular weight determined is a polystyrene equivalent molecular weight.

| Trade name | Molecular weight |
| --- | --- |
| F-700 | 6200000 |
| F-228 | 2800000 |
| F-128 | 1100000 |
| F-80 | 707000 |
| F-40 | 354000 |
| F-20 | 189000 |
| F-10 | 98900 |
| F-4F | 37200 |
| F-1 | 9830 |
| A-5000 | 5870 |
| A-1000 | 870 |
| A-500 | 500 (GPC) |

GPC apparatus: manufactured by Tosoh Corporation under the trade name of HCL-8020 Column: manufactured by Tosoh Corporation, two TSKGel GMHXL (7.8 mm in inside diameter×30 cm in length), one TSK guardculmn HXL-H (6.0 mm in inside diameter×4.0 cm in length)
Mobile phase: tetrahydrofuran
Sample injection amount: 0.1 ml
Sample concentration: 1 mg/ml
Flow rate: 1.0 ml/min
A differential refractometer (RI) was used as a detector.

<Measurement of Unreacted Monomer Content>

A measuring sample was obtained by dissolving about 0.5 g of a vinyl-based polymer mixture containing a solvent and an unreacted monomer in about 10 g of acetone and adding butyl acetate as an internal standard. Using a gas chromatograph equipped with two kinds of columns (manufactured by Shimadzu Corporation, GC-14A), the content of the unreacted monomer of the measuring sample was measured under the following conditions.

Column: SPB-5 manufactured by SUPELCO
Injection amount: 1 µL
Injection temperature: 150° C.
Detector temperature: 190° C.
Column temperature: after maintaining at 50° C. for one minute, heating to 180° C. at a rate of 10° C. per minute, followed by maintaining for 10 minutes
Column: WAX-10 manufactured by SUPELCO
Injection amount: 1 µL
Injection temperature: 150° C.
Detector temperature: 190° C.
Column temperature: after maintaining at 50° C. for one minute, heating to 180° C. at a rate of 10° C. per minute, followed by maintaining for 10 minutes <Calculation of Rate of Polymerization and Solid Content>

The rate of polymerization was determined by the following procedure. That is, the amount of the unreacted monomer was measured and the rate of polymerization was calculated by the following equation (1) or (2). The equation (1) is applied when no solvent is contained, while the equation (2) is applied when a solvent is contained.

The solid content was determined by the following procedure. That is, the amount of the unreacted monomer was measured and the solid content was calculated by the following equation (3) or (4). The equation (3) is applied when no solvent is contained, while the equation (4) is applied when a solvent is contained.

$$\text{Rate of polymerization} = \{1 - (\text{mass of unreacted monomer})/(\text{mass of polymer mixture} - \text{mass of polymerization initiator})\} \times 100 \quad (1)$$

$$\text{Rate of polymerization} = \{1 - (\text{mass of residual monomer})/(\text{mass of polymer mixture} - \text{mass of solvent} - \text{mass of polymerization initiator})\} \times 100 \quad (2)$$

$$\text{Solid content} = \{1 - (\text{mass of residual monomer})/(\text{mass of polymer mixture})\} \times 100 \quad (3)$$

$$\text{Solid content} = \{1 - (\text{mass of residual monomer} + \text{mass of solvent})/(\text{mass of polymer mixture})\} \times 100 \quad (4)$$

Example 1

In the first step, a continuous tank reactor equipped with a stirring blade, a material feeding line, a polymer extracting line, a nitrogen pressure line, and a temperature controller was used. A material mixture comprising 20 parts by mass of styrene, 35 parts by mass of methyl methacrylate, 5 parts by mass of n-butyl methacrylate, 40 parts by mass of glycidyl methacrylate, and 2 parts by mass of di-tertiary butyl peroxide (trade name: PERBUTYL™ D, manufactured by NOF Corporation) as a polymerization initiator was continuously fed to a first reactor maintained at 200° C. and 1.0 MPa so as to control a retention time to 15 minutes, and then polymerized to obtain a reaction intermediate mixture. Simultaneously, the reaction intermediate mixture was continuously extracted from the first reactor using a gear pump.

The molecular weight of the vinyl-based polymer contained in the resulting reaction intermediate mixture (hereinafter referred to as an intermediate vinyl-based polymer) was measured by GPC. As a result, the mass average molecular weight was 3100, the solid content of the reaction intermediate mixture measured by gas chromatography was 95.8%, and the rate of polymerization was 95.7%.

The reaction intermediate mixture containing 102 parts by mass of the intermediate vinyl-based polymer was charged in a tank reactor as a second reactor equipped with a stirring blade and a temperature controller and 1 part by mass of di-tertiary butyl peroxide, (trade name: PERBUTYL™ D, manufactured by NOF Corporation) as a polymerization initiator was added, and then the polymerization in the second step was conducted by maintaining at 160° C. for one hour to obtain a vinyl-based polymer mixture.

The vinyl-based polymer mixture thus obtained was analyzed by gas chromatography. As a result, the solid content was 99.2% and the rate of polymerization was 99.2%. The molecular weight of the vinyl-based polymer was measured by GPC. As a result, the mass average molecular weight was 3300.

Example 2

In the first step, the same apparatus as in Example 1 was used. A material mixture comprising 20 parts by mass of styrene, 35 parts by mass of methyl methacrylate, 5 parts by mass of n-butyl methacrylate, 40 parts by mass of glycidyl methacrylate, 20 parts by mass of toluene, and 2 parts by mass of di-tertiary butyl peroxide (trade name: PERBUTYL™ D, manufactured by NOF Corporation) as a polymerization initiator was continuously fed to a first reactor maintained at 200° C. and 1.0 MPa so as to control a retention time to 10 minutes, and then polymerized to obtain a reaction intermediate mixture. Simultaneously, the reaction intermediate mixture was continuously extracted from the first reactor using a gear pump.

The molecular weight of the resulting intermediate vinyl-based polymer was measured by GPC. As a result, the weight average molecular weight was 2600, the solid content of the reaction intermediate mixture measured by gas chromatography was 79.5%, and the rate of polymerization was 95.0%.

The reaction intermediate mixture containing 122 parts by mass of the intermediate vinyl-based polymer was charged in a tank reactor equipped with a stirring blade and a temperature controller and 1 part by mass of di-tertiary butyl peroxide (trade name: PERBUTYL™ D, manufactured by NOF Corporation) as a polymerization initiator was added, and then the polymerization in the second step was conducted by maintaining at 160° C. for one hour to obtain a vinyl-based polymer mixture. The vinyl-based polymer mixture thus obtained was analyzed by gas chromatography. As a result, the solid content was 83.0%, the rate of polymerization was 99.1%, and the mass average molecular weight of the vinyl-based polymer measured by GPC was 2700.

Example 3

The reaction intermediate mixture containing 122 parts by mass of the intermediate vinyl-based polymer obtained in the first reactor in the same manner as in Example 2 was mixed with 1 part by mass of di-tertiary butyl peroxide (trade name: PERBUTYL™ D, manufactured by NOF Corporation) as a polymerization initiator, continuously fed to a tubular reactor as a second reactor so as to control a retention time to 30 minutes, and then continuously polymerized in the second step to obtain a vinyl-based polymer mixture. The jacket temperature of the tubular reactor was controlled to 180° C. The vinyl-based polymer mixture thus obtained was analyzed by gas chromatography. As a result, the solid content was 82.5%, the rate of polymerization was 98.5%, and the mass average molecular weight of the vinyl-based polymer measured by GPC was 2700.

Example 4

The reaction intermediate mixture containing 122 parts by mass of the intermediate vinyl-based polymer obtained in the first reactor in the same manner as in Example 2 was mixed with 0.5 parts by mass of di-tertiary butyl peroxide (trade name: PERBUTYL™ D, manufactured by NOF Corporation) as a polymerization initiator and then continuously fed to a tubular reactor so as to control a retention time to 30 minutes. Furthermore, a mixture of 0.5 parts by mass of di-tertiary butyl peroxide (trade name: PERBUTYL™ D, manufactured by NOF Corporation) and 0.5 parts by mass of toluene was continuously fed from an intermediate point of the tubular reactor in the amount of 1 part by mass based on 122 parts by mass of the polymerization component to obtain a vinyl-based polymer mixture. The jacket temperature of the tubular reactor was controlled to 180° C. The vinyl-based polymer mixture thus obtained was analyzed by gas chromatography. As a result, the solid content was 82.8%, the rate of polymerization was 98.9%, and the mass average molecular weight of the vinyl-based polymer measured by GPC was 2600.

Example 5

In the first step, the same apparatus as in Example 1 was used. A material mixture comprising 20 parts by mass of styrene, 20 parts by mass of n-butyl methacrylate, 10 parts by mass of 2-ethylhexyl acrylate, 20 parts by mass of 4-hydroxybutyl acrylate, 30 parts by mass of glycidyl methacrylate, 20 parts by mass of an aromatic hydrocarbon mixture (trade name: SOLVESSO™ 150, manufactured by Exxon Chemical Co., Ltd.) as a solvent, and 5 parts by mass of di-tertiary hexyl peroxide (trade name: PERHEXYL™ D, manufactured by NOF Corporation) as a polymerization initiator was preheated to 60° C., fed to a first reactor maintained at 240° C. and 2.0 MPa so as to control a retention time to 5 minutes and then polymerized to obtain a reaction intermediate mixture. Simultaneously, the reaction intermediate mixture was continuously extracted from the first reactor using a gear pump.

The molecular weight of the resulting intermediate vinyl-based polymer was measured by GPC. As a result, the weight average molecular weight was 2100, the solid content of the reaction intermediate mixture measured by gas chromatography was 77.6%, and the rate of polymerization was 92.0%.

The reaction intermediate mixture containing 125 parts by mass of the intermediate vinyl-based polymer was charged in a tank reactor equipped with a stirring blade and a temperature controller, and 1 part by mass of di-tertiary hexyl peroxide (trade name: PERHEXYL™ D, manufactured by NOF Corporation) as a polymerization initiator was added, and then the polymerization in the second step was conducted by maintaining at 160° C. for one hour to obtain a vinyl-based polymer mixture. The vinyl-based polymer mixture thus obtained was analyzed by gas chromatography. As a result, the solid content was 82.5%, the rate of polymerization was 98.0%, and the mass average molecular weight of the vinyl-based polymer measured by GPC was 2200.

Example 6

In the first step, the same apparatus as in Example 1 was used. A material mixture comprising 30 parts by mass of styrene, 15 parts by mass of 2-ethylhexyl acrylate, 15 parts by mass of 4-hydroxyethyl methacrylate, 40 parts by mass of glycidyl methacrylate, 40 parts by mass of an aromatic hydrocarbon mixture (trade name: SOLVESSO™ 150, manufactured by Exxon Chemical Co., Ltd.) as a solvent, and 1 part by mass of di-tertiary hexyl peroxide (trade name: PERHEXYL™ D, manufactured by NOF Corporation) as a polymerization initiator was preheated to 100° C., continuously fed to a first reactor maintained at 240° C. and 2.0 MPa so as to control a retention time to 5 minutes, and then polymerized to obtain a reaction intermediate mixture. Simultaneously, the reaction intermediate mixture was continuously extracted from the first reactor using a gear pump.

The molecular weight of the resulting intermediate vinyl-based polymer was measured by GPC. As a result, the weight average molecular weight was 2300, the solid content of the reaction intermediate mixture measured by gas chromatography was 68.7%, and the rate of polymerization was 95.9%.

The reaction intermediate mixture containing 141 parts by mass of the intermediate vinyl-based polymer was charged in a tank reactor equipped with a stirring blade and a temperature controller, and 1 part by mass of di-tertiary hexyl peroxide (trade name: PERHEXYL™ D, manufactured by NOF Corporation) as a polymerization initiator was added, and then the polymerization in the second step was conducted by maintaining at 160° C. for one hour to obtain a vinyl-based polymer mixture. The vinyl-based polymer mixture thus obtained was analyzed by gas chromatography. As a result, the solid content was 70.5%, the rate of polymerization was 98.1%, and the mass average molecular weight of the vinyl-based polymer measured by GPC was 2500.

Example 7

In the first step, the same apparatus as in Example 1 was used. A material mixture comprising 20 parts by mass of styrene, 20 parts by mass of n-butyl methacrylate, 15 parts by mass of 2-ethylhexyl acrylate, 10 parts by mass of isoboronyl acrylate, 34 parts by mass of 2-hydroxyethyl methacrylate, 1 part by mass of methacrylic acid, and 2 parts by mass of di-tertiary hexyl peroxide (trade name: PERHEXYL™ D, manufactured by NOF Corporation) is a polymerization initiator was fed to a first reactor maintained at 240° C. and 2.0 MPa so as to control a retention time to 17 minutes, and then polymerized to obtain a reaction intermediate mixture. Simultaneously, the reaction intermediate mixture was continuously extracted from the first reactor using a gear pump.

The molecular weight of the resulting intermediate vinyl-based polymer was measured by GPC. As a result, the weight average molecular weight was 2000, the solid content of the reaction intermediate mixture measured by gas chromatography was 92.6%, and the rate of polymerization was 92.5%.

The reaction intermediate mixture containing 102 parts by mass of the intermediate vinyl-based polymer was charged in a tank reactor equipped with a stirring blade and a temperature controller and 0.5 parts by mass of di-tertiary hexyl peroxide (trade name: PERHEXYL™ D, manufactured by NOF Corporation) as a polymerization initiator, and 30 parts by mass of an aromatic hydrocarbon mixture (trade name: SUPERSOL 1500, manufactured by Nippon Petrochemicals Company, Limited) were added, and then the polymerization in the second step was conducted by maintaining at 160° C. for one hour to obtain a vinyl-based polymer mixture. The vinyl-based polymer mixture thus obtained was analyzed by gas chromatography. As a result, the solid content was 75.5%, the rate of polymerization was 97.5%, and the mass average molecular weight of the vinyl-based polymer measured by GPC was 2200.

Example 8

In the first step, the same apparatus as in Example 1 was used. A material mixture comprising 30 parts by mass of styrene, 15 parts by mass of isobutyl acrylate, 20 parts by mass of 2-ethylhexyl methacrylate, 14 parts by mass of 2-hydroxyethyl acrylate, 20 parts by miss of 4-hydroxybutyl acrylate, 1 part by mass of methacrylic acid, 30 parts by mass of SUPERSOL 1500 (manufactured by Nippon Petrochemicals Company, Limited) as a solvent, and 2 parts by mass of di-tertiary hexyl peroxide (trade name: PERHEXYL™ D, manufactured by NOF Corporation) as a polymerization initiator was fed to a first reactor maintained at 240° C. and 2.0 MPa so as to control a retention time to 17 minutes, and then polymerized to obtain a reaction intermediate mixture. Simultaneously, the reaction intermediate mixture was continuously extracted from the first reactor using a gear pump.

The molecular weight of the resulting intermediate vinyl-based polymer was measured by GPC. As a result, the weight average molecular weight was 1500, the solid content of the reaction intermediate mixture measured by gas chromatography was 69.3%, and the rate of polymerization was 89.5%.

The reaction intermediate mixture containing 132 parts by mass of the intermediate vinyl-based polymer was charged in a tank reactor equipped with a stirring blade and a temperature controller and 0.5 parts by mass of di-tertiary hexyl peroxide (trade name: PERHEXYL™ D, manufactured by NOF Corporation) as a polymerization initiator was added, and then the polymerization in the second step was conducted by maintaining at 160° C. for one hour to obtain a vinyl-based polymer mixture. The vinyl-based polymer mixture thus obtained was analyzed by gas chromatography. As a result, the solid content was 75.8%, the rate of polymerization was 98.0%, and the mass average molecular weight of the vinyl-based polymer measured by GPC was 1800.

Example 9

In the first step, the same apparatus as in Example 1 was used. A material mixture comprising 30 parts by mass of styrene, 40 parts by mass of n-butyl methacrylate, 10 parts by mass of 2-ethylhexyl methacrylate, 20 parts by mass of an aromatic hydrocarbon mixture (trade name: SUPERSOL 1500, manufactured by Nippon Petrochemicals Company, Limited) as a solvent, and 3 parts by mass of di-tertiary hexyl peroxide (track name: PERHEXYL™ D, manufactured by NOF Corporation) as a polymerization initiator, and a material mixture comprising 20 parts by mass of maleic anhydride and 10 parts by mass of ethyl-3-ethoxypropionate were dissolved by preheating to 50° C., fed to a first reactor maintained at 250° C. and 2.0 MPa so as to control a retention time to 10 minutes, and then polymerized to obtain a reaction intermediate mixture. Simultaneously, the reaction intermediate mixture was continuously extracted from the first reactor using a gear pump.

The molecular weight of the resulting intermediate vinyl-based polymer was measured by GPC. As a result, the weight average molecular weight was 2300, the solid content of the reaction intermediate mixture measured by gas chromatography was 67.9%, and the rate of: polymerization was 87.3%.

The reaction intermediate mixture containing 133 parts by mass of the intermediate vinyl-based polymer was charged in a tank reactor equipped with a stirring blade and a temperature controller, and 1 part by mass of di-tertiary hexyl peroxide (trade name: PERHEXYL™ D, manufactured by NOF Corporation) as a polymerization initiator was added, and then the polymerization in the second step was conducted by maintaining at 160° C. for line hour to obtain a vinyl-based polymer mixture. The vinyl-based polymer mixture thus obtained was analyzed by gas chromatography. As a result, the solid content was 74.8%, the rate of polymerization was 96.2%, and the mass average molecular weight of the vinyl-based polymer measured by GPC was 2600.

Comparative Example 1

In the first step, the same apparatus as in Example 1 was used. A material mixture comprising 10 parts by mass of styrene, 10 parts by mass of n-butyl acrylate, 20 parts by mass of isobutyl methacrylate, 10 parts by mass of 2-ethylhexyl methacrylate, 20 parts by mass of 2-hydroxyethyl acrylate, 30 parts by mass of glycidyl methacrylate, 100 parts by mass of an aromatic hydrocarbon mixture (trade name: SOLVESSO™ 150, manufactured by Exxon Chemical Co., Ltd.) as a solvent, and 1 part by mass of di-tertiary hexyl peroxide (trade name: PERHEXYL™ D, manufactured by NOF Corporation) as a polymerization initiator was fed to a first reactor maintained at 150° C. and 2.0 MPa so as to control a retention time to 5 minutes, and then polymerized to obtain a reaction intermediate mixture. Simultaneously, the reaction intermediate mixture was continuously extracted from the first reactor using a gear pump.

The molecular weight of the resulting intermediate vinyl-based polymer was measured by GPC. As a result, the weight average molecular weight was 8800, the solid content of the reaction intermediate mixture measured by gas chromatography was 22.3%, and the rate of polymerization was 43.8%.

The reaction intermediate mixture containing 201 parts by mass of the intermediate vinyl-based polymer was charged in a tank reactor equipped with a stirring blade and a temperature controller and 1 part by mass of di-tertiary hexyl peroxide (trade name: PERHEXYL™ D, manufactured by NOF Corporation) as a polymerization initiator was added, and then the polymerization in the second step was conducted by maintaining at 140° C. for 5 hours to obtain a vinyl-based polymer mixture. The vinyl-based polymer mixture thus obtained was analyzed by gas chromatography. As a result, the solid content was 44.3%, the rate of polymerization was 87.4%, and the mass average molecular weight of the vinyl-based polymer measured by GPC was 23000.

Since Examples 1 to 9 are within the scope of the present invention, a low molecular weight vinyl-based polymer with less unreacted monomer content could be efficiently prepared.

In Comparative Example 1, the rate of polymerization in the first step is less than 45% and the vinyl-based polymer obtained in the second step showed an increased molecular weight. As a result, the mass average molecular weigh of the final vinyl-based polymer exceeds 10000 and thus the polymer is not suited for use as coating materials, adhesives and coating agents. Since the retention time in the second step exceeds 240 minutes, the resulting vinyl-based polymer has less unreacted monomer content, but was not efficiently prepared.

Evaluation Items of Thermosetting Coating Composition and Coating Material, and Evaluation Procedure (Examples 10 to 17, Comparative Examples 2 to 8)<

<Mass Average Molecular Weight>

After preparing a tetrahydrofuran solution (0.4% by mass) of a vinyl-based copolymer used in a thermosetting coating composition, 100 µl of the resulting solution was injected into a gel permeation chromatography (GPC) apparatus manufactured by Tosoh Corporation with a column (GE4000HXL™ and G2000HXL™) manufactured by Tosoh Corporation, and then a standard polystyrene equivalent mass average molecular weight was measured under the conditions of a flow rate of 1 ml/min., an eluent of tetrahydrofuran and a column temperature of 40° C.

<Resin Solid Content>

After sampling 1 g of a polymer solution on an aluminum pan, the polymer solution was dried at 150° C. for one hour and the nonvolatile content (% by mass) was measured.

<Measurement of Unreacted Monomer Content>

A measuring sample was obtained by dissolving about 0.5 g of a vinyl-based polymer mixture containing a solvent and an unreacted monomer in about 10 g of acetone and adding butyl acetate as an internal standard. Using a gas chromatograph equipped with two kinds of columns (a) and (b) (manufactured by Shimadzu Corporation, GC-14A), the content of the unreacted monomer of the measuring sample was measured under the following conditions.

(a) Column: SPB-5 manufactured by SUPELCO
 Injection amount: 1 µL
 Injection temperature: 150° C.
 Detector temperature: 190° C
 Column temperature: after maintaining at 50° C. for one minute, heating to 180° C. at a rate of 10° C. per minute, followed by maintaining for 10 minutes (b) Column: WAX-10 manufactured by SUPELCO
 Injection amount: 1 µL
 Injection temperature: 150° C.
 Detector temperature: 190° C.
 Column temperature: after maintaining at 50° C. for one minute, heating to 180° C. at a rate of 10° C. per minute, followed by maintaining for 10 minutes <Calculation of Rate of Polymerization and Solid Content>

The rate of polymerization was determined by the following procedure. That is, the amount of the unreacted monomer was measured and the rate of polymerization was calculated by the following equation (A).

The solid content was determined by the following procedure. That is, the amount of the unreacted monomer was measured and the solid content was calculated by the following, equation (B).

Rate of polymerization={1−(mass of residual monomer)/(mass of polymer mixture−mass of solvent−mass of polymerization initiator)}×100    (A)

Solid content={1−(mass of residual monomer+mass of solvent)/(mass of polymer mixture)}×100    (B)

<Storage Stability>

After standing at 60° C. for 24 hours, the viscosity of a coating material was measured by Ford cup #4. Storage stability was evaluated from an increase in second after a test according to the following criteria.

Criteria
A: increase in second is less than 13 seconds, excellent storage stability
B: increase in second is 13 seconds or more and less than 20 seconds, good storage stability, suited for practical use
C: increase in second is 20 seconds or more and less than 30 seconds, poor storage stability, not suited fox practical use
D: increase in second is 30 seconds or more, drastically poor storage stability, not suited for practical use <Surface Bursting>

On a degreased tin plate (300 mm×450 mm), the resulting coating material was applied by a multi-coating method so that the resulting coating film has a dry thickness of 30 µm, allowed to stand at normal temperature for 15 minutes and then fired by a hot air dryer at 140° C. for 30 minutes to form a coating film. It was visually observed whether or not poor appearance due to surface bursting during the formation of a coating film is observed on the surface of the coating film of this test plate, and the evaluation was conducted according to the following criteria.

Criteria
B: no surface bursting is observed, good appearance (surface state)
D: surface bursting is observed, poor appearance (surface state)

<Molecular Weight Between Crosslinkages (Crosslinking Density)>

In the same manner as in case of the evaluation of surface bursting, except that a degreased polypropylene plate (150 mm×150 mm) was used in place of the tin plate, a test plate was fabricated.

After a coating film (4 mm×30 mm) was cut out form the resulting test plate, viscoelasticity was measured under the conditions of a measuring frequency of 3.5 Hz and a heating rate of 3° C./min. using a RHEOVIBRON (DDV-II-EP™) manufactured by Toyo Boldwin Co., Ltd. and the molecular weight between crosslinkages Mc was determined by the following equation. The smaller the value of Mc, the higher the crosslinking density becomes.

$$Mc = 3\rho RT/E'$$

where $\rho$ represents a density of a coating film (1 in this test), R represents a gas constant, $E'$ represents a minimum value of dynamic modulus of elasticity in a high temperature rubber range, and T represents a temperature at which a dynamic modulus of elasticity becomes a minimum value $E'$ in a high temperature rubber range).

Samples, which show the molecular weight between crosslinkages of 600 or less, were rated good.

<Gel Fraction>

In the same manner as in case of the evaluation of the molecular weight between crosslinkages, a test plate was fabricated and a coating film (50 mm×50 mm) was cut out form the resulting test plate and then immersed in a solvent mixture of acetone and methanol in a mass ratio of 50/50 at reflux temperature for 3 hours. The content (% by mass) of the insoluble matter was evaluated as a gel fraction. The larger the value of the gel fraction, the higher the crosslinking degree of the coating film becomes. Samples, which show the gel fraction of 90% or more, were rated good.

<Extension at Break (Toughness)>

In the same manner as in case of the evaluation of the molecular weight between crosslinkages, a test plate was fabricated and a coating film (10 mm×70 mm) was cut out form the resulting test plate. Using a tester RTA-250 manufactured by Orientec Co., Ltd., a tensile test was conducted at a testing speed of 10 mm/min. and extension at break (%) was measured. The larger the extension at break, the higher the toughness becomes. Samples, which show the extension at break of 5% or more, were rated good.

<Pencil Hardness (Hardness)>

In the same manner as in case of the evaluation of surface bursting, a test plate was fabricated. The resulting coating film was scratched at an angle of 45 degrees using Mitsubishi Pencil UNI and the maximum hardness of the pencil, which causes no scratching, was measured. Samples, which show the pencil hardness of F or more, were rated good.

<Acid Resistance>

In them same manner as in case of the evaluation of surface bursting, a test plate was fabricated. On the resulting coating film, an aqueous 40 mass % sulfuric acid solution was added dropwise in the form of spots and, after standing at 70° C. for 15 minutes and washing with water, a change in appearance of spot marking was visually observed.

<Solvent Resistance>

In the same manner as in case of the evaluation of surface bursting, a test plate was fabricated. The resulting coating film was subjected to a rubbing test of rubbing with gauze impregnated with methyl ethyl ketone 50 times, and then a change in appearance was visually observed.

<Scratch Resistance>

In the same manner as in case of the evaluation of surface bursting, a test plate was fabricated. The resulting coating film was coating film was contacted with a gauze impregnated with an aqueous 50 mass % solution of Maken Cleanser™ manufactured by Maken Sekken Co., Ltd. and subjected to a friction test of rubbing 50 times under a load of 1 kg, using a Rubbing Tester manufactured by Daiei Kagaku Seiki Mfg. Co., Ltd., and then a change in appearance was visually observed.

<Thermal Yellowing Resistance>

In the same manner as in case of the evaluation of surface bursting, a test plate was fabricated. The resulting coating film was overbaked at 160° C. for one hour. Using SE2000 manufactured by Nippon Denshoku Industries Co., Ltd., a value b of the coating film was measured before and after the test and a difference was evaluated as yellowing degree.

<Water Resistance>

In the same manner as in case of the evaluation of surface bursting, a test plate was fabricated. The resulting coating film was immersed in hot water at 40° C. for 10 days and the surface state of the coating film was visually observed. It was examined whether or not a change in state such as "bulge", "blister", or "whitening" occurs.

<Weatherability>

In the same manner as in case of the evaluation of surface bursting, a test plate was fabricated. Using Sunshine Weather Meter™ (manufactured by Suga Test Instruments Co., Ltd.), initial gloss value and gloss value after tested for 2000 hours of the resulting test plate were measured and a difference was evaluated.

<Curability at Low Temperature>

On a degreased tin plate (300 mm×450 mm), the resulting coating material was applied by a multi-coating method so that the resulting coating film has a dry thickness of 30 μm, allowed to stand at normal temperature for 15 minutes and then fired by a hot air dryer at 120° C. for 30 minutes to form a coating film. This coating film was subjected to the above solvent resistance test using xylene and a change in appearance of the coating film was visually observed.

Acid resistance, solvent resistance, scratch resistance, thermal yellowing resistance, water resistance, weatherability and curability at low temperature were evaluated according to the following criteria.

Criteria

A: Quality of the coating film after the test is the same as that before the test and remarkably excellent properties of the coating film are maintained.

B-A: Quality of the coating film after the test is substantially the same as that before the test and excellent properties of the coating film are maintained.

B: Quality of the coating film after the test is slightly deteriorated as compared with that before the test, but satisfactory practical properties are maintained.

C-B: Quality of the coating film after the test is deteriorated as compared with that before the test, but satisfactory practical properties are maintained.

D-C: Quality of the coating film after the test is deteriorated as compared with that before the test, and it is not suited for practical use.

D: Quality of the coating film after the test is drastically deteriorated as compared with that before the test, and it can not be put for practical use.

Synthesis Example 1

Synthesis of Polymer Solution (A-1)

A pressure-resistant continuous tank type reactor equipped with a stirring blade, a material feeding line, a polymer extracting line, a nitrogen pressure line, and a temperature controller was previously heated to 220° C. under a nitrogen gas atmosphere. A mixture comprising 40 parts by mass of SOLVESSO™ #150 (manufactured by Esso Co., aromatic hydrocarbon) as a solvent, 40 parts by mass of glycidyl methacrylate, 20 parts by mass of 4-hydroxybutyl acrylate, 10 parts by mass of i-butyl methacrylate, 10 parts by mass of 2-ethylhexyl methacrylate, 10 parts by mass of cyclohexyl methacrylate, and 10 parts by mass of styrene as a monomer, and 2 parts by mass of 2,2'-azobis-2-methylbutyronitrile as a polymerization initiator was continuously fed to the reactor while instilling from the upper portion of the reactor using an instillation pump so as to control a retention time to 5 minutes.

5 minutes after the initiation of injection of the mixture, extraction of the resin solution through an extraction port located at the lower portion of the reactor at the same rate as that of feeding was initiated. After extracting for 15 minutes, the resin solution was discarded as a first fraction. Subsequently, the resin solution was continuously recovered in a separately prepared tank reactor equipped with a stirrer, a temperature controller and a condenser. After collecting for 45 minutes, extraction was terminated and the remained resin solution in the continuous tank type reactor was discarded.

The tank reactor containing the recovered resin solution was maintained at 145° C. and 0.5 parts by mass of 2,2'-azobis-2-methylbutyronitrile as an additional polymerization initiator (additional catalyst) was continuously added over one hour, and then a ratio of conversion into a resin was enhanced by maintaining at 130° C. for one hour to obtain an epoxy group-containing vinyl-based copolymer solution (A-1) having a resin solid content of about 71% by mass.

The composition of monomers used to synthesize the polymer, the amount of the polymerization initiator, the polymerization temperature, and properties of the resulting polymer solutions and polymers are shown in Table 1.

Synthesis Examples 2 to 8

Synthesis of Copolymer Solutions (A-2) to (A-8)

In the same manner as in Synthesis Example 1, except that the composition of monomers to be used, the amount of the polymerization initiator to be added, and the polymerization temperature are as shown in Table 1, epoxy group-containing vinyl-based copolymer solutions (A-2) to (A-8) were synthesized. Properties of the resulting polymer solutions and polymers are shown in Table 1.

Synthesis Examples 9 to 11

Synthesis of Polymer Solutions (E-1) to (E-3)

For comparison, vinyl-based polymer solutions (E-1) to (E-3), which do not meet the conditions defined in the copolymer solution (A), were synthesized in the same manner as in Synthesis Example 1, except that the composition of monomers to be used, the amount of the polymerization initiator to be added and the polymerization temperature are as shown in Table 2. Properties of the resulting polymer solutions and polymers are shown in Table: 2. In Table 2, properties, which are not within the scope defined in polymer solution (A), in the polymer solutions (E-1) to (E-3) are marked with the symbol *.

TABLE 1

| | Polymer solution | A-1 | A-2 | A-3 | A-4 | A-5 | A-6 | A-7 | A-8 |
|---|---|---|---|---|---|---|---|---|---|
| Composition of monomer | GMA | 40 | 40 | 40 | 30 | 30 | 55 | 40 | 40 |
| | HBA | 20 | | | 35 | | | 10 | 10 |
| | HEA | | 20 | | | | 5 | 10 | 10 |
| | HEMA | | | 20 | | 45 | | | |
| | i-BA | | 10 | | | 10 | 15 | | |
| | n-BA | | | 20 | | | | | |
| | i-BMA | 10 | | | | | | 10 | 10 |
| | n-BMA | | | | 15 | | | | |
| | EHA | | 10 | | | | 10 | | |
| | EHMA | 10 | | | | | | 10 | 10 |
| | CHMA | 10 | | | | | | 10 | 10 |
| | IBXMA | | | 10 | | | 5 | | |
| | St | 10 | 10 | 20 | 20 | 15 | 10 | 10 | 10 |
| | First step: polymerization temperature (° C.) | 220 | 220 | 230 | 220 | 240 | 220 | 210 | 210 |
| | First step: retention time (min.) | 5 | 5 | 5 | 5 | 5 | 5 | 5 | 5 |
| | First step: polymerization initiator | 2.8 | 2.8 | 3 | 2.8 | 3.4 | 2.8 | 2 | 1.9 |
| | First step: rate of polymerization (%) | 95.8 | 95.1 | 95.2 | 95.4 | 93.8 | 94.9 | 95.0 | 95.0 |
| | Second step: polymerization temperature (° C.) | 145 | 145 | 145 | 145 | 145 | 145 | 145 | 145 |
| | Second step: retention time (min.) | 60 | 60 | 60 | 60 | 60 | 60 | 60 | 60 |
| | Second step: polymerization initiator | 0.5 | 0.5 | 0.5 | 0.5 | 0.5 | 0.5 | 0.5 | 0.5 |
| | Second step: rate of polymerization (%) | 99.7 | 99.7 | 99.6 | 99.8 | 99.0 | 99.6 | 99.7 | 99.7 |
| Properties | Epoxy equivalent weight (g/eq) | 355 | 355 | 355 | 473 | 473 | 258 | 355 | 355 |
| | Hydroxyl group equivalent weight (g/eq) | 720 | 580 | 650 | 411 | 289 | 2320 | 650 | 650 |
| | Glass transition temperature (° C.) | 21 | 21 | 32 | 11 | 48 | 24 | 25 | 25 |
| | Resin solid content (%) | 71 | 71 | 70 | 71 | 70 | 71 | 71 | 71 |
| | Residual unreacted monomer content (%) | 0.02 | 0.05 | 0.1 | 0.05 | 0.45 | 0.05 | 0.05 | 0.05 |
| | Mass average molecular weight | 3000 | 3000 | 2300 | 3000 | 2100 | 3000 | 4900 | 5100 |

TABLE 2

| | Polymer solution | E-1 | E-2 | E-3 |
|---|---|---|---|---|
| Composition of monomer | GMA | 19 | 60 | 30 |
| | HBA | 4 | | 30 |
| | HEA | | 20 | 30 |
| | HEMA | | | |
| | i-BA | 27 | | |
| | n-BA | | | |
| | i-BMA | 30 | | |
| | n-BMA | | 20 | |
| | EHA | | | |
| | EHMA | | | |
| | CHMA | | | |
| | IBXMA | | | |
| | St | 20 | | 10 |
| | First step: polymerization temperature (° C.) | 220 | 220 | 220 |
| | First step: retention time (min.) | 5 | 5 | 5 |
| | First step: polymerization initiator | 2.8 | 8.1 | 1.8 |
| | First step: rate of polymerization (%) | 95.5 | 95.4 | 95.3 |
| | Second step: polymerization temperature (° C.) | 145 | 145 | 145 |
| | Second step: retention time (min.) | 60 | 60 | 60 |
| | Second step: polymerization initiator | 0.5 | 0.5 | 0.5 |
| | Second step: rate of polymerization (%) | 98.0 | 99.7 | 99.8 |
| Properties | Epoxy equivalent weight (g/eq) | 747 | 237 | 473 |
| | Hydroxyl group equivalent weight (g/eq) | 3600 | 580 | 217 |
| | Glass transition temperature (° C.) | 28 | 25 | −4 |
| | Resin solid content (%) | 69 | 71 | 71 |
| | Residual unreacted monomer content (%) | 1.5* | 0.05 | 0.05 |
| | Mass average molecular weight | 3000 | 1800* | 7100* |

In Tables 1 and 2, the amounts of monomers and polymerization initiators are expressed by "parts by mass". The epoxy equivalent weight, the hydroxyl group equivalent weight and the glass transition temperature show theoretical values. Abbreviations mean the following compounds.
GMA: glycidyl methacrylate
HBA: 4-hydroxybutyl acrylate
HEA: 2-hydroxyethyl acrylate
HEMA: 2-hydroxyethyl methacrylate
i-BA: i-butyl acrylate
n-BA: n-butyl acrylate
i-BMA: i-butyl methacrylate
EHA: 2-ethylhexyl acrylate
EHMA: 2-ethylhexyl methacrylate
CHMA: cyclohexyl methacrylate
IBXA: isoboronyl acrylate
St: styrene
Polymerization initiator (i): 2,2'-azobis-2-methylbutyronitrile Synthesis Example 12

Synthesis of Polymer Solution (13-1)

A pressure-resistant continuous tank type reactor equipped with a stirring blade, a material feeding line, a polymer extracting line, a nitrogen pressure line, and a temperature controller was previously heated to 200° C. under a nitrogen gas atmosphere. A mixture comprising 25 parts by mass of SOLVESSO™ #150, 5 parts by mass of propylene glycol monomethyl ether acetate and 20 parts by mass of propylene glycol monomethyl ether acetate as a solvent, 20 parts by mass of maleic anhydride, 10 parts by mass of methacrylic acid, 20 parts by mass of i-butyl methacrylate, 10 parts by mass of 2-ethylhexyl methacrylate, 20 parts by mass of cyclohexyl methacrylate, and 20 parts by mass of styrene as a monomer, and 2.8 parts by mass of t-butylperoxy-2-ethylhexanoate as a polymerization initiator was continuously fed to the reactor while instilling from the upper portion of the reactor using an instillation pump so as to control a retention time to 5 minutes.

5 minutes after the initiation of injection of the mixture, extraction of the resin solution through an extraction port located at the lower portion of the reactor at the same rate as that of feeding was initiated. After extracting for 15 minutes, the resin solution was discarded as a first fraction. Subsequently, the resin solution was continuously recovered in a separately prepared tank reactor equipped with a stirrer, a temperature controller and a condenser. After collecting for 30 minutes, extraction was terminated and the remained resin solution in the continuous tank type reactor was discarded.

The tank reactor containing the recovered resin solution was maintained at 145° C. and 0.5 parts by mass of t-butylperoxy-2-ethylhexanoate as an additional polymerization initiator (additional catalyst) was continuously added dropwise over one hour, and then a ratio of conversion into a resin was enhanced by maintaining at 130° C. for one hour. The inner temperature of the tank reactor containing the recovered resin solution was decreased to 70° C. and 6.2 parts by mass of methanol and 0.5 parts by mass of triethylamine were added, and then acid anhydride groups were partially monoesterified by maintaining the inner temperature at 70° C. for 7 hours.

It was confirmed by IR (infrared spectroscopy; 1780 cm$^{-1}$) that the acid anhydride groups are decreased to obtain a vinyl-based copolymer solution (B-1) having a resin solid content of 64% by mass.

The composition of monomers used to synthesize the polymer, the amount of the polymerization initiator, the polymerization temperature, and properties of the resulting polymer solutions and polymers are shown in Table 3. The resulting vinyl-based copolymer (B-1) had 1% by mass of a maleic anhydride monomer unit, 19% by mass of a monomethyl maleate monomer unit and 10% by mass of a methacrylic acid monomer unit, based on 100% by mass of the entire monomer units.

Synthesis Examples 13 to 16

Synthesis of Polymer Solutions (F-1) to (F-4)

For comparison, vinyl-based polymer solutions (F-1) to (F-4), which do not meet the conditions defined in the copolymer solution (B), were synthesized in the same manner as in Synthesis Example 12, except that the composition of monomers to be used, the amount of the polymerization initiator to be added and the polymerization temperature are as shown in Table 3. Properties of the resulting polymer solutions and polymers are shown in Table 3. In Table 3, properties, which are not within the scope defined in polymer solution (B), in the polymer solutions (F-1) to (F-4) are marked with the symbol *.

TABLE 3

| | Polymer solution | B-1 | F-1 | F-2 | F-3 | F-4 |
|---|---|---|---|---|---|---|
| Composition of monomer | maleic anhydride | 20 | 61 | 15 | 25 | 25 |
| | MAA | 10 | | | | |
| | i-BMA | 20 | 20 | 20 | 20 | 20 |
| | n-BA | | 19 | | | 30 |
| | EHMA | 10 | | 15 | 10 | 20 |
| | CHMA | 20 | | 25 | 15 | |
| | St | 20 | | 25 | 30 | 5 |
| | First step: polymerization temperature (° C.) | 200 | 200 | 200 | 200 | 200 |
| | First step: retention time (min.) | 5 | 5 | 5 | 5 | 5 |
| | First step: polymerization initiator | 2.8 | 8.1 | 1.8 | 2.8 | 2.6 |
| | First step: rate of polymerization (%) | 95.3 | 95.1 | 95.2 | 94.6 | 93.8 |
| | Second step: polymerization temperature (° C.) | 145 | 145 | 145 | 145 | 145 |
| | Second step: retention time (min.) | 60 | 60 | 60 | 60 | 60 |
| | Second step: polymerization initiator | 0.5 | 0.5 | 0.5 | 0.5 | 0.5 |
| | Second step: rate of polymerization (%) | 99.9 | 99.9 | 99.9 | 98.6 | 98.4 |
| Properties | Acid equivalent weight (g/eq) | 380 | 196 | 653 | 392 | 392 |
| | Glass transition temperature (° C.) | 67 | 64 | 61 | 74 | 18 |
| | Resin solid content (%) | 64 | 64 | 64 | 63 | 63 |
| | Residual unreacted monomer content (%) | 0.02 | 0.02 | 0.02 | 1.1* | 1.1* |
| | Mass average molecular weight | 4000 | 1900* | 7100* | 4000 | 4000 |

In Table 3, the amounts of monomers and polymerization initiators are expressed by "parts by mass". The acid equivalent weight and the glass transition temperature show theoretical values. Abbreviations mean the following compounds.

MAA: methyl acrylate
i-BMA: i-butyl methacrylate
n-BA: n-butyl acrylate
EHMA: 2-ethylhexyl methacrylate
CHMA: cyclohexyl methacrylate
St: styrene
Polymerization initiator (ii): t-butylperoxy-2 ethylhexanoate Example 10

100 g of a polymer solution (A-1), 100 g of a polymer solution (B-1), 0.2 g of MODAFLOW™ (manufactured by Monsanto Co., acryl-based surface modifier), 1 g of benzyl tri-n-butylammonium bromide, 2 g of TINUVIN™ 900 (manufactured by Ciba-Geigy Limited, ultraviolet absorber), 2 g of SANOL™ LS-765 (manufactured by Sankyo Co., Ltd., photostabilizer), and 10 g of n-butanol were mixed with stirring. The mixture was diluted with a solvent mixture of an aromatic hydrocarbon mixture (trade name: SOLVESSO™ 150, manufactured by Exxon Chemical Co., Ltd.) and propylene glycol monomethyl ether acetate in a mass ratio of 80/20 so as to adjust the viscosity at 20° C. to 28 seconds with Ford cup #4 to obtain a coating material of the present invention (thermosetting coating composition). The main composition of the coating material thus prepared is shown in Table 4.

Examples 11 to 17

In Examples 11 to 17, coating materials of the present invention (thermosetting coating compositions) were obtained in the same manner as in Example 10, except that the kind of the polymer solution (A) to be used and the amounts of the polymer solutions (A) and (B) are as shown in Table 4. In Examples 16 and 17, coating materials of the present invention (thermosetting coating compositions) were obtained in the same manner as in Example 1, except that the kind of the polymer solution (A) to be used and the amounts of the polymer solutions (A) and (B) are as shown in Table 4 and the auxiliary curing agent (C) is added in the amount shown in Table 4. As the auxiliary curing agent (C), either of an auxiliary curing agent (C-1): YUBAN™ 20SE60 (manufactured by Mitsui Chemicals, Inc., n-butylated melamine resin, nonvolatile content: 60% by mass) and an auxiliary curing agent (C-2): DENACOL™ EX-212 (manufactured by Nagase Chemical Co., Ltd., aliphatic epoxy resin, nonvolatile content: 100% by mass) was used.

Comparative Examples 2 to 8

In Comparative Examples 2 to 4, comparative coating materials were obtained in the same manner as in the Example, except that a polymer solution (E) was used in place of the polymer solution (A). In Comparative Examples 5 to 8, comparative coating materials were obtained in the same manner as in the Example, except that a polymer solution (F) was used in place of the polymer solution (B). Main compositions of the respective coating materials thus prepared are shown in Tables 5 and 6.

(Results)

The results of the respective Examples and Comparative Examples are shown in Tables 4 to 6.

As shown in Table 4, the coating materials of the present invention (thermosetting coating compositions) prepared in Examples 10 to 17 are excellent in storage stability and curability at low temperature. The coating films formed by using the resulting coating materials cause no surface bursting and show good appearance, and also show high crosslinking density (molecular weight between crosslinkages), gel faction, toughness (extension at break), and hardness (pencil hardness) and are excellent in acid resistance, solvent resistance, scratch resistance, thermal yellowing resistance, water resistance, and weatherability. As described above, the coating materials of the present invention (thermosetting coating compositions) obtained in Examples 10 to 17 have both excellent properties of the coating material and properties of the coating film.

To the contrary, as shown in Tables 5 and 6, the coating materials (thermosetting coating compositions), which do not meet the conditions defined in the present invention, obtained in Comparative Examples 2 to 8 do not simultaneously meet all properties evaluated.

More specifically, the coating material of Comparative Example 2 prepared by using a polymer solution (E-1) having a residual unreacted monomer content of more than 1% by mass, am epoxy equivalent weight of more than 500 g/eq and a hydroxyl group equivalent weight of more than 2500 g/eq in place of the polymer solution (A) shows poor appearance due to surface bursting and is insufficient in curability at low temperature, and also the resulting coating film is insufficient in crosslinking density, toughness, hardness, acid resistance, solvent resistance, scratch resistance, water resistance, and weatherability.

The coating material of Comparative Example 3 prepared by using a polymer solution (E-2) having a polymerization initiator content of more than 8% by mass, a mass average molecular weight of less than 2000 and an epoxy equivalent weight of less than 250 g/eq in place of the polymer solution (A) is insufficient in curability at low temperature and storage stability, and also the resulting coating film is insufficient in toughness, acid resistance, solvent resistance, scratch resistance, thermal yellowing resistance, waiter resistance, and weatherability.

The coating material of Comparative Example 4 prepared by using a polymer solution (E-3) having a glass transition temperature of less than 10° C., a hydroxyl group equivalent weight of less than 250 g/eq and a mass average molecular weight of more than 7000 in place of the polymer solution (A) is insufficient in curability at low temperature and storage stability, and is also insufficient in solvent resistance, scratch resistance, thermal yellowing resistance, water resistance, and weatherability.

The coating material of Comparative Example 5 prepared by using a polymer solution (F-1) having a polymerization initiator content of more than 8% by mass, a mass average molecular weight of less than 2000 and an acid equivalent weight of less than 250 g/eq in place of the polymer solution (B) is insufficient in curability at low temperature and storage stability, and also the resulting coating film is insufficient in toughness, acid resistance, solvent resistance, scratch resistance, thermal yellowing resistance, water resistance, and weatherability.

The coating material of Comparative Example 6 prepared by using a polymer solution (F-2) having an acid equivalent weight of more than 500 g/eq and a mass average molecular weight of more than 7000 in place of the polymer solution (B) is insufficient in storage stability and curability at low temperature, and also the resulting coating film is insufficient in hardness, solvent resistance, scratch resistance, water resistance, and weatherability.

The coating material of Comparative Example 7 prepared by using a polymer solution (F-3) having a residual unreacted monomer content of more than 1% by mass and a glass transition temperature of higher than 70° C. in place of the polymer solution (B) shows poor appearance due to surface bursting, and also the resulting coating film is insufficient in toughness.

The coating material of Comparative Example 8 prepared by using a polymer solution (F-4) having a residual unreacted monomer content of more than 1% by mass and a glass transition temperature of lower than 20° C. in place of the polymer solution (B) shows poor appearance due to surface bursting and insufficient in curability at low temperature, and also the resulting coating film is insufficient in hardness, scratch resistance, water resistance, and weatherability.

TABLE 4

| | | Examples | | | | | | | |
|---|---|---|---|---|---|---|---|---|---|
| | | 10 | 11 | 12 | 13 | 14 | 15 | 16 | 17 |
| Composition | Polymer solution (A) | A-1 | A-2 | A-3 | A-4 | A-5 | A-6 | A-7 | A-8 |
| | Amount of solution (A) | 100 | 100 | 100 | 100 | 90 | 90 | 90 | 90 |
| | Polymer solution (B) | B-1 | B-1 | B-1 | B-1 | B-1 | B-1 | B-1 | B-1 |
| | Amount of solution (B) | 100 | 100 | 100 | 100 | 110 | 110 | 90 | 95 |
| | Auxiliary curing agent (C) | — | — | — | — | — | — | C-1 | C-2 |
| | Amount of (C) | | | | | | | 20 | 10 |
| Evaluation results | Storage stability (sec) | 15 B | 14 B | 13 B | 17 B | 12 A | 18 B | 16 B | 16 B |
| | Bursting of coating film | B | B | B | B | B | B | B | B |
| | Molecular weight between crosslinkages | 250 | 280 | 350 | 220 | 220 | 200 | 240 | 240 |
| | Gel fraction (%) | 97 | 97 | 95 | 94 | 93 | 98 | 98 | 98 |
| | Extension at break (%) | 10 | 9 | 7 | 7 | 8 | 6 | 9 | 9 |
| | Pencil hardness | H | H | F | H | F | 2H | 2H | 2H |
| | Acid resistance | B-A | B-A | B | B | B | A | A | A |
| | Solvent resistance | A | A | B-A | B-A | B | A | A | A |
| | Scratch resistance | B-A | B-A | B | B | B | A | B-A | B-A |
| | Thermal yellowing resistance | A | A | A | A | B | B | A | A |
| | Water resistance | A | A | A | A | A | A | A | A |
| | Weatherability | A | A | A | A | A | B | A | A |
| | Curability at low temperature | A | A | B | B | B | A | A | A |

TABLE 5

| | | Comparative Examples | | |
|---|---|---|---|---|
| | | 2 | 3 | 4 |
| Composition | Polymer solution (E) | E-1 | E-2 | E-3 |
| | Amount of solution (E) | 100 | 100 | 100 |
| | Polymer solution (B) | B-1 | B-1 | B-1 |
| | Amount of solution (B) | 100 | 100 | 100 |
| | Auxiliary curing agent (C) | — | — | — |
| | Amount of (C) | | | |
| Evaluation results | Storage stability (sec) | 10 A | 25 C | 25 C |
| | Bursting of coating film | D | B | B |
| | Molecular weight between crosslinkages | 1700 | 150 | 200 |
| | Gel fraction (%) | 87 | 95 | 98 |
| | Extension at break (%) | 2 | 2 | 7 |
| | Pencil hardness | 2B | F | F |
| | Acid resistance | D-C | C | C-B |
| | Solvent resistance | D | C | D-C |
| | Scratch resistance | D | C | D-C |
| | Thermal yellowing resistance | B | D | D |
| | Water resistance | D | D | D |
| | Weatherability | D | D | D |
| | Curability at low temperature | D | D | D-C |

TABLE 6

| | | Comparative Examples | | | |
|---|---|---|---|---|---|
| | | 5 | 6 | 7 | 8 |
| Composition | Polymer solution (A) | A-1 | A-1 | A-1 | A-1 |
| | Amount of solution (A) | 100 | 100 | 100 | 100 |
| | Polymer solution (F) | F-1 | F-2 | F-3 | F-4 |
| | Amount of solution (F) | 100 | 100 | 100 | 100 |
| | Auxiliary curing agent (C) | — | — | — | — |
| | Amount of (C) | | | | |
| Evaluation results | Storage stability (sec) | 35 D | 32 D | 15 B | 17 B |
| | Bursting of coating film | B | B | D | D |
| | Molecular weight between crosslinkages | 250 | 280 | 350 | 220 |
| | Gel fraction (%) | 97 | 97 | 95 | 94 |
| | Extension at break (%) | 2 | 9 | 2 | 7 |
| | Pencil hardness | F | B | F | 2B |
| | Acid resistance | D | B-A | B | B |
| | Solvent resistance | D-C | D-C | B-A | B-A |
| | Scratch resistance | D-C | D | B | D |
| | Thermal yellowing resistance | D | A | A | A |
| | Water resistance | D | D | B | D-C |
| | Weatherability | D | D | B | D-C |
| | Curability at low temperature | D-C | D-C | B | D-C |

In Tables 4 to 6, the amounts of polymer solutions and auxiliary curing agents are expressed by "parts by mass". Data of storage stability show an increase in second.

INDUSTRIAL APPLICABILITY

According to the present invention, a low-molecular weight vinyl-based polymer with less unreacted monomer content can be efficiently prepared only by polymerization without being separately provided with an equipment for removing the unreacted monomer. The vinyl-based polymer thus obtained is best suited for use as coating materials, inks, waxes, adhesives, adhesives, resin additives, binder resins for toner, and surface treating agents because surface bursting and foaming on the surface of the coating film caused by the unreacted monomer are suppressed.

According to the present invention, it is made possible to provide a thermosetting coating composition capable of meeting the high solid-requirement, which is excellent in curability at low temperate and storage stability and causes less surface bursting during the formation of a coating film and is also capable of forming a coating film which is excellent in hardness, toughness, crosslinking density, acid resistance, thermal yellowing resistance, weatherability, water resistance, solvent resistance, and scratch resistance, and also which is suited for use as a coating material for top coating of automobiles, and to provide a coating material comprising the composition.

The invention claimed is:

1. A method for producing a vinyl-based polymer, comprising the steps of:
 a first step of continuously feeding a material mixture comprising a vinyl-based monomer and a solvent selected from the group consisting of aromatic hydrocarbons, ketones, esters, alcohols, and mixtures thereof, to a continuous tank first reactor and polymerizing the vinyl-based monomer under conditions of a polymerization temperature of 150° to 300° C. and a retention time of 1 to 60 minutes at a rate of polymerization of 50 to 99% to obtain a reaction intermediate mixture, wherein the material mixture is continuously fed to the first reactor after preheating; and
 a second step of feeding a polymerization initiator in the amount of 0.01 to 5 parts by mass based on 100 parts by mass of the vinyl-based monomer and the reaction intermediate mixture to a second reactor, and further polymerizing the vinyl-based monomer under conditions of a polymerization temperature of 100° to 200° C. and a retention time of 10 to 240 minutes at a rate of polymerization of 80% or more.

2. The method for producing a vinyl-based polymer according to claim 1, wherein a resulting polymer has a mass average molecular weight of 1500 to 10000.

3. The method for producing a vinyl-based polymer according to claim 1, wherein the material mixture contains the polymerization initiator in an amount of 0.01 to 12 parts by mass based on 100 parts by mass of the vinyl-based monomer.

4. The method for producing a vinyl-based polymer according to claim 3, wherein the polymerization initiator is used in an amount of 0.01 to 8 parts by mass based on 100 parts by mass of the vinyl-based monomer.

5. The method for producing a vinyl-based polymer according to claim 1, wherein the material mixture contains a solvent in an amount of 200 parts by mass or less based on 100 parts by mass of the vinyl-based monomer.

6. The method for producing a vinyl-based polymer according to claim 5, wherein a content of the solvent is 2 to 100 parts by mass based on 100 parts by mass of the vinyl-based monomer.

7. The method for producing a vinyl-based polymer according to claim 1, wherein the polymerization temperature in the first step is 200° to 280° C.

8. The method for producing a vinyl-based polymer according to claim 1, wherein the rate of polymerization in the first step is 80 to 98%.

9. The method of claim 1, wherein the solvent is selected from the group consisting of aromatic hydrocarbons, ketones, and mixtures thereof.

10. The method of claim 1, wherein the solvent is selected from the group consisting of aromatic hydrocarbons, ketones, alcohols, and mixtures thereof.

11. The method of claim 1, wherein the solvent is selected from the group consisting of aromatic hydrocarbons, ketones, esters, and mixtures thereof.

* * * * *